(12) United States Patent
Choi et al.

(10) Patent No.: US 12,348,856 B2
(45) Date of Patent: Jul. 1, 2025

(54) METHOD AND DEVICE FOR OBTAINING IMAGE OF OBJECT

(71) Applicant: SAMSUNG ELECTRONICS CO., LTD., Suwon-si (KR)

(72) Inventors: Myungkyu Choi, Suwon-si (KR); Sujung Bae, Suwon-si (KR); Kwangmin Byeon, Suwon-si (KR); Inho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 18/102,956

(22) Filed: Jan. 30, 2023

(65) Prior Publication Data

US 2023/0262323 A1  Aug. 17, 2023

Related U.S. Application Data

(63) Continuation of application No. PCT/KR2022/020173, filed on Dec. 12, 2022.

(30) Foreign Application Priority Data

Feb. 11, 2022 (KR) .................. 10-2022-0018405
Mar. 8, 2022 (KR) .................. 10-2022-0029608

(51) Int. Cl.
*H04N 23/60* (2023.01)
*G06T 7/246* (2017.01)
(Continued)

(52) U.S. Cl.
CPC ............. *H04N 23/64* (2023.01); *G06T 7/248* (2017.01); *G06V 10/26* (2022.01); *G06V 10/56* (2022.01);
(Continued)

(58) Field of Classification Search
CPC .... H04N 23/64; H04N 23/611; H04N 23/634; H04N 23/60; H04N 23/80; G06T 7/248;
(Continued)

(56) References Cited

U.S. PATENT DOCUMENTS 6,973,212 B2   12/2005   Boykov et al.
9,530,232 B2   12/2016   Maciocci et al.
(Continued)

FOREIGN PATENT DOCUMENTS

CN      107247511      10/2017
JP      2015-149552     8/2015
(Continued)

OTHER PUBLICATIONS

Choy et al., "3D-R2N2: A Unified Approach for Single and Multi-view 3D Object Reconstruction", Apr. 2, 2016, 17 pages.
(Continued)

*Primary Examiner* — Christopher S Kelley
*Assistant Examiner* — Asmamaw G Tarko
(74) *Attorney, Agent, or Firm* — Nixon & Vanderhye, P.C.

(57) ABSTRACT

An example electronic device is configured to divide an image into a plurality of areas, calculate a number of feature points included in each of the plurality of divided areas by detecting the feature points from the image, select at least one candidate area among the plurality of divided areas based on a result of the calculating, and generate an image of the target object based on a partial image captured from the capture area determined in at least one selected candidate area.

21 Claims, 19 Drawing Sheets

(51) Int. Cl.
    *G06V 10/26*      (2022.01)
    *G06V 10/56*      (2022.01)
    *G06V 10/764*     (2022.01)
    *G06V 40/20*      (2022.01)
    *H04N 23/611*     (2023.01)
    *H04N 23/63*      (2023.01)

(52) U.S. Cl.
    CPC ........... *G06V 40/20* (2022.01); *H04N 23/611* (2023.01); *G06T 2207/30196* (2013.01); *G06T 2207/30244* (2013.01); *G06V 10/764* (2022.01); *H04N 23/634* (2023.01)

(58) Field of Classification Search
    CPC ........... G06T 2207/30196; G06T 2207/30244; G06V 10/56; G06V 10/26; G06V 40/20; G06V 10/764; G06V 10/82; G06V 40/18; G06V 10/25; G06F 3/01
    USPC ........................................................ 348/169
    See application file for complete search history.

(56) References Cited

U.S. PATENT DOCUMENTS

| | | | |
|---|---|---|---|
| 10,008,038 | B2 | 6/2018 | Miller |
| 10,203,762 | B2 | 2/2019 | Bradski et al. |
| 10,268,266 | B2 | 4/2019 | Mathey-Owens et al. |
| 10,444,963 | B2 | 10/2019 | Bereza et al. |
| 10,719,939 | B2 | 7/2020 | Holzer et al. |
| 10,768,712 | B2 | 9/2020 | Schwesig et al. |
| 10,922,583 | B2 | 2/2021 | Kaehler et al. |
| 11,132,162 | B2 | 9/2021 | Bar-Zeev et al. |
| 2011/0119640 | A1* | 5/2011 | Berkes .................. G06F 3/0304 715/863 |
| 2014/0152697 | A1 | 6/2014 | Shin |
| 2014/0191927 | A1* | 7/2014 | Cho ..................... G06F 3/011 345/8 |
| 2014/0191946 | A1* | 7/2014 | Cho ..................... G06F 3/013 345/156 |
| 2015/0002394 | A1* | 1/2015 | Cho ..................... G06F 3/013 345/156 |
| 2020/0257360 | A1* | 8/2020 | Klingström ............. G06F 3/013 |
| 2021/0051266 | A1* | 2/2021 | Matsuo ................ H04N 23/672 |
| 2021/0192197 | A1* | 6/2021 | Zhao .................... G06V 10/764 |
| 2021/0223857 | A1* | 7/2021 | Liu ..................... G06V 40/166 |
| 2021/0373657 | A1* | 12/2021 | Connor .................... G06T 5/90 |
| 2023/0188828 | A1* | 6/2023 | Shiozaki ............. H04N 23/611 348/78 |
| 2023/0206586 | A1* | 6/2023 | Lee ..................... G06V 10/761 382/103 |

FOREIGN PATENT DOCUMENTS

| | | |
|---|---|---|
| KR | 10-2014-0090549 | 7/2014 |
| KR | 10-1687017 | 12/2016 |
| KR | 10-2018-0109341 | 10/2018 |
| KR | 10-2020-0111144 | 9/2020 |
| KR | 10-2021-0059697 | 5/2021 |

OTHER PUBLICATIONS

Hampali et al., "HOnnotate: A method for 3D Annotation of Hand and Object Poses", CVF, 2020, 11 pages.

Wang et al., "In-hand Object Scanning via RGB-D Video Segmentation", *2019 International Conference on Robotics and Automation (ICRA)* (*2019*): 3296-3302, 7 pages.

Mottaghi et al., "The Role of Context for Object Detection and Semantic Segmentation in the Wild", CVF, 2014, 8 pages.

International Search Report dated Mar. 17, 2023 in corresponding PCT application No. PCT/KR2022/020173.

Extended Search Report dated Jan. 24, 2025 in European Patent Application No. 22926208.4.

\* cited by examiner

1651

1652

1653

METHOD AND DEVICE FOR OBTAINING IMAGE OF OBJECT

CROSS-REFERENCE TO RELATED APPLICATIONS

This application is a continuation application of International Application No. PCT/KR2022/020173 designating the United States, filed on Dec. 12, 2022, in the Korean Intellectual Property Receiving Office and claiming priority to Korean Patent Application No. 10-2022-0018405, filed on Feb. 11, 2022 and Korean Patent Application No. 10-2022-0029608 filed on Mar. 8, 2022, in the Korean Intellectual Property Office, the disclosures of which are incorporated by reference herein in their entireties.

BACKGROUND

1. Field

The disclosure relates to a method and apparatus for obtaining an image of an object.

2. Description of Related Art

Along with the development of digital technologies, various electronic devices such as smartphones, personal computers (PCs), and wearable devices for capturing and reproducing images are being released. For example, the electronic devices may capture an image using a camera. Recently, a technology for identifying an object such as a cup, a book, a monitor, a lamp, or a person from an image captured by a camera and a technology of segmenting an object of interest to a user in the image have been developed. However, it may be difficult to accurately segment the object of interest due to various features of the object of interest such as a color, a shape, a movement, and texture in the image and a change of a background in the image. In addition, object segmentation technology of the related art may require a large amount of computation in the electronic device. Therefore, it is desirable to reduce the amount of time and computation required for object segmentation while segmenting an object with high segmentation performance in an image.

SUMMARY

An electronic device according to an embodiment may select a target object indicated by a gaze direction of a user from an image and obtain an image of the selected target object.

The electronic device according to an embodiment may determine a capture area in an image and capture the image in the determined capture area to obtain an image of a target object.

The electronic device according to an embodiment may determine, as the capture area, an area (e.g., an optimized area) for capturing an image of a target object in an image.

The electronic device according to an embodiment may change a position and/or size of a capture area in an image.

According to an embodiment, an electronic device includes a camera, a memory configured to store computer-executable instructions, and a processor configured to execute the instructions by accessing the memory. The instructions may be configured to divide an image captured by the camera into a plurality of areas, calculate a number of feature points included in each of the plurality of divided areas by detecting the feature points from the image, select at least one candidate area among the plurality of divided areas based on a result of the calculating, select a target object corresponding to an eye gaze direction of a user by tracking an eye gaze of the user, determine a capture area in the at least one selected candidate area based on detection of occurrence of an event with respect to the target object, and generate an image of the target object based on a partial image captured from the determined capture area in the image.

According to an embodiment, a method implemented by a processor, the method includes dividing an image captured by a camera into a plurality of areas, calculating a number of feature points included in each of the plurality of divided areas by detecting the feature points from the image, selecting at least one candidate area among the plurality of divided areas based on a result of the calculating, selecting a target object corresponding to an eye gaze direction of a user by tracking an eye gaze of the user, determining a capture area in the at least one selected candidate area based on detection of occurrence of an event with respect to the target object, and generating an image of the target object based on a partial image captured from the determined capture area in the image.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
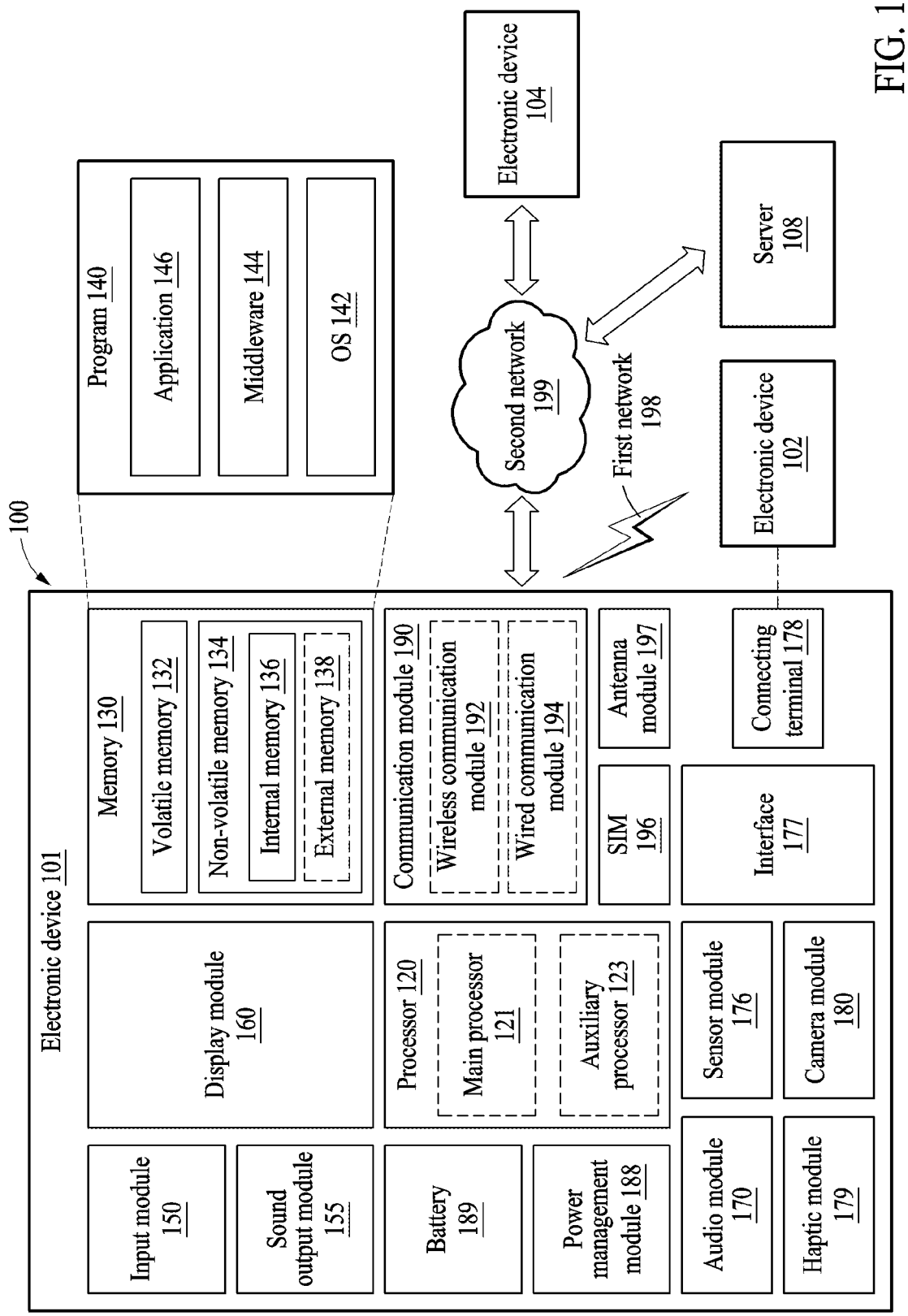
FIG. 1 is a block diagram illustrating an example electronic device in a network environment according to various embodiments.

Hereinafter, example embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
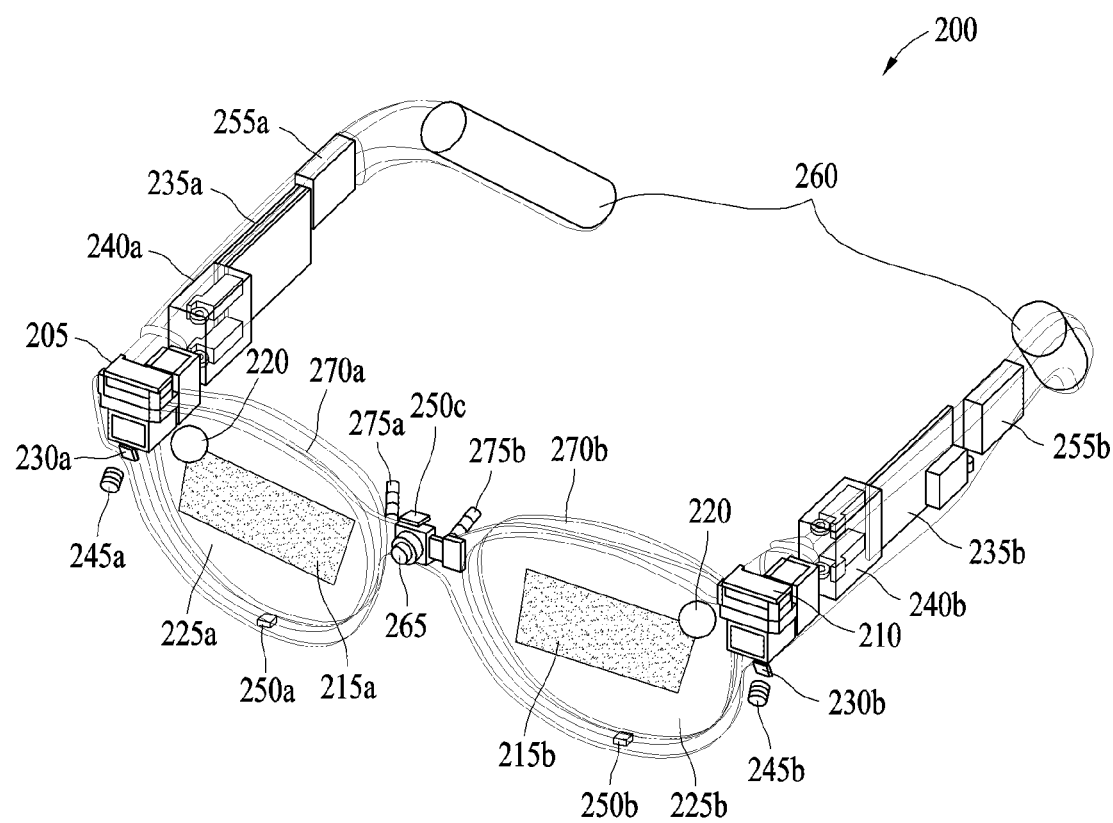
FIG. 2 is a diagram illustrating a structure of an example wearable augmented reality (AR) device according to various embodiments.

FIG. 2 is a diagram illustrating a structure of an example wearable augmented reality (AR) device according to various embodiments.

Referring to FIG. 2, a wearable AR device 200 may be worn on a face of a user to provide an image associated with an AR service and/or a virtual reality service to the user.

In an embodiment, the wearable AR device 200 may include a first display 205, a second display 210, screen display portions 215*a* and 215*b*, an input optical member 220, a first transparent member 225*a*, a second transparent member 225*b*, lighting units 230*a* and 230*b*, a first PCB 235*a*, a second PCB 235*b*, a first hinge 240*a*, a second hinge 240*b*, first cameras 245*a* and 245*b*, a plurality of microphones (e.g., a first microphone 250*a*, a second microphone 250*b*, and a third microphone 250*c*), a plurality of speakers (e.g., a first speaker 255*a* and a second speaker 255*b*), a battery 260, second cameras 275*a* and 275*b*, a third camera 265, and visors 270*a* and 270*b*.

In an embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, and an LCoS, the wearable AR device 200 may include a light source configured to emit light to a screen output area of the display. In an embodiment, when the display is capable of generating light by itself, for example, when the display is either an OLED or a micro-LED, the wearable AR device 200 may provide a virtual image with a relatively high quality to the user even though a separate light source is not included. In an embodiment, when the display is implemented as an OLED or a micro LED, a light source may be unnecessary, and accordingly the wearable AR device 200 may be reduced in weight. Hereinafter, a display capable of generating light by itself may be referred to as a "self-luminous display", and a description will be made on the assumption of a self-luminous display.

A display (e.g., the first display 205 and the second display 210) according to various embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display is composed of a micro-LED.

However, the example embodiments are not limited thereto. A pixel may include R, G and B pixels, and a single chip may be implemented by a plurality of pixels including R, G, and B pixels.

In an embodiment, the display (e.g., the first display 205 and the second display 210) may include a display area made up of pixels for displaying a virtual image, and light-receiving pixels (e.g., photo sensor pixels) that receive the light reflected from eyes disposed among pixels, convert the reflected light into electrical energy, and output light.

In an embodiment, the wearable AR device 200 may detect a gaze direction (e.g., a movement of a pupil) of the user through the light-receiving pixels. For example, the wearable AR device 200 may detect and track a gaze direction of a right eye of the user and a gaze direction of a left eye of the user through one or more light-receiving pixels of the first display 205 and one or more light-receiving pixels of the second display 210. The wearable AR device 200 may determine a central position of a virtual image according to the gaze directions of the right eye and the left eye of the user (e.g., directions in which pupils of the right eye and the left eye of the user gaze) detected through the one or more light-receiving pixels.

In an embodiment, the light emitted from the display (e.g., the first display 205 and the second display 210) may reach the screen display portion 215a formed on the first transparent member 225a that faces the right eye of the user, and the screen display portion 215b formed on the second transparent member 225b that faces the left eye of the user, by passing through a lens (not shown) and a waveguide. For example, the light emitted from the display (e.g., the first display 205 and the second display 210) may be reflected from a grating area formed on the input optical member 220 and the screen display portions 215a and 215b to be delivered to the user's eyes, by passing through a waveguide. The first transparent member 225a and/or the second transparent member 225b may be formed as, for example, a glass plate, a plastic plate, or a polymer, and may be transparently or translucently formed.

In an embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an embodiment, the screen display portions 215a and 215b or the transparent member (e.g., the first transparent member 225a and the second transparent member 225b) may include a lens including a waveguide and a reflective lens.

In an embodiment, the waveguide may be formed of glass, plastic, or a polymer, and may have a nanopattern formed on one surface of the inside or outside, for example, a grating structure of a polygonal or curved shape. According to an embodiment, light incident to one end of the waveguide may be propagated inside a display waveguide by the nanopattern to be provided to the user. In an embodiment, a waveguide including a free-form prism may provide incident light to the user through a reflection mirror. The waveguide may include at least one diffraction element (e.g., a diffractive optical element (DOE) and a holographic optical element (HOE)) or at least one reflective element (e.g., a reflection mirror). In an embodiment, the waveguide may guide light emitted from the first display 205 and the second display 210 to the eyes of the user, using at least one diffractive element or a reflective element included in the waveguide.

According to an embodiment, the diffractive element may include the input optical member 220 and/or an output optical member (not shown). For example, the input optical member 220 may refer, for example, to an input grating area, and the output optical member (not shown) may refer, for example, to an output grating area. The input grating area may function, for example, as an input terminal to diffract (or reflect) light output from the display (e.g., the first display 205 and the second display 210) (e.g., a micro-LED) to transmit the light to a transparent member (e.g., the first transparent member 225a and the second transparent member 225b) of the screen display portions 215a and 215b. The output grating area may function, for example, as an exit to diffract (or reflect) light transmitted to a transparent member (e.g., the first transparent member 225a and the second transparent member 225b) of the waveguide to the eyes of the user.

According to an embodiment, the reflective element may include a total reflection optical element or a total reflection waveguide for total internal reflection (TIR). For example, TIR, which is one scheme for inducing light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the first display 205 and the second display 210 may be guided by the waveguide through the input optical member 220. Light traveling in the waveguide may be guided toward the eyes of the user through the output optical member. The screen display portions 215a and 215b may be determined based on light emitted toward the eyes of the user.

In an embodiment, the first cameras 245a and 245b may include a camera used for 3 degrees of freedom (3DoF), head tracking of 6DoF, hand detection and tracking, gestures and/or space recognition. For example, the first cameras 245a and 245b may include a global shutter (GS) camera to detect a movement of a head or a hand and track the movement.

For example, a stereo camera may be applied to the first cameras 245a and 245b for head tracking and space recognition, and a camera with the same standard and performance may be applied. A GS camera having excellent performance (e.g., image dragging) may be used for the first cameras 245a and 245b to detect a minute movement such as a quick movement of a hand or a finger and to track the movement.

According to an embodiment, a rolling shutter (RS) camera may be used for the first cameras 245a and 245b. The first cameras 245a and 245b may perform a simultaneous localization and mapping (SLAM) function through space recognition and depth capturing for 6DoF. The first cameras 245a and 245b may perform a user gesture recognition function.

In an embodiment, the second cameras 275a and 275b may be used for detecting and tracking the pupil. The second cameras 275a and 275b may be referred to, for example, as a camera for eye tracking (ET). The second camera 265a may track a gaze direction of the user. In consideration of the gaze direction of the user, the wearable AR device 200 may position a center of a virtual image projected on the screen display portions 215a and 215b according to the gaze direction of the user.

A GS camera may be used for the second cameras 275a and 275b to detect the pupil and track a quick pupil movement. The second camera 265a may be installed for a left eye or a right eye, and a camera having the same performance and standard may be used for the second camera 265a for the left eye and the right eye.

In an embodiment, the third camera 265 may be referred to as a "high resolution (HR)" or a "photo video (PV)", and may include a high-resolution camera. The third camera 265 may include a color camera having functions for obtaining a high-quality image, such as an automatic focus (AF) function and an optical image stabilizer (OIS) function. The examples are not limited thereto, and the third camera 265 may include a GS camera or an RS camera.

In an embodiment, at least one sensor (e.g., a gyro sensor, an acceleration sensor, a geomagnetic sensor, a UWB sensor, a touch sensor, an illuminance sensor and/or a gesture sensor) and the first cameras 245a and 245b may perform at least one of the functions among head tracking for 6DoF, pose estimation and prediction, gesture and/or space recognition, and a SLAM function through depth imaging.

In an embodiment, the first cameras 245a and 245b may be classified and used as a camera for head tracking or a camera for hand tracking.

In an embodiment, the lighting units 230a and 230b may be used differently according to positions at which the lighting units 230a and 230b are attached. For example, the lighting units 230a and 230b may be attached together with the first cameras 245a and 245b mounted around a hinge (e.g., the first hinge 240a and the second hinge 240b) that connects a frame and a temple or around a bridge that connects frames. If capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In an embodiment, the lighting units 230a and 230b attached to the periphery of the frame of the wearable AR device 200 may be an auxiliary means (devices) for facilitating detection of an eye gaze direction when the second cameras 275a and 275b capture pupils. When the lighting units 230a and 230b are used as an auxiliary means (devices) for detecting the eye gaze direction, an IR LED of an IR wavelength may be included.

In an embodiment, a PCB (e.g., the first PCB 235a and the second PCB 235b) may include a processor (not shown), a memory (not shown), and a communication module (not shown) that control components of the wearable AR device 200. The communication module may have the same configuration as the communication module 190 of FIG. 1, and the same description as the communication module 190 may be applicable to the communication module of the wearable AR device 200. For example, the communication module may support the establishment of a direct (or wired) communication channel or a wireless communication channel between the wearable AR device 200 and an external electronic device, and support communication through the established communication channel. The PCB may transmit an electrical signal to the components included in the wearable AR device 200.

The communication module (not shown) may include one or more communication processors that are operable independently of the processor and that support a direct (e.g., wired) communication or a wireless communication. According to an embodiment, the communication module (not shown) may include a wireless communication module (e.g., a cellular communication module, a short-range wireless communication module, or a GNSS communication module) or a wired communication module (e.g., a LAN communication module, or a PLC module). A corresponding one (not shown) of these communication modules may communicate with the external electronic device via a short-range communication network (e.g., Bluetooth™, Wi-Fi direct, or IrDA) or a long-range communication network (e.g., a legacy cellular network, a 5G network, a next-generation communication network, the Internet, or a computer network (e.g., a LAN or a WAN). These various types of communication modules may be implemented as a single component (e.g., a single chip), or may be implemented as multi components (e.g., multi chips) separate from each other.

The wireless communication module may support a 5G network after a 4G network, and next-generation communication technology, e.g., NR access technology. The NR access technology may support eMBB, mMTC, or URLLC. The wireless communication module may support a high-frequency band (e.g., a mmWave band) to achieve, e.g., a high data transmission rate. The wireless communication module may support various technologies for securing performance on a high-frequency band, such as, e.g., beam-forming, massive MIMO, FD-MIMO, an array antenna, analog beam-forming, or a large scale antenna.

The wearable AR device 200 may further include an antenna module (not shown). The antenna module may transmit or receive a signal or power to or from the outside (e.g., an external electronic device) of the wearable AR device 200. According to an embodiment, the antenna module may include an antenna including a radiating element including a conductive material or a conductive pattern formed in or on a substrate (e.g., the first PCB 235a and the second PCB 235b). According to an embodiment, the antenna module may include a plurality of antennas (e.g., array antennas).

In an embodiment, a plurality of microphones (e.g., the first microphone 250a, the second microphone 250b, and the third microphone 250c) may process an external acoustic signal into electrical audio data. The processed audio data may be variously utilized according to a function (or an application being executed) being performed by the wearable AR device 200.

In an embodiment, the plurality of speakers (e.g., the first speaker 255a and the second speaker 255b) may output audio data received from the communication module or stored in the memory.

In an embodiment, one or more batteries 260 may be included, and may supply power to the components constituting the wearable AR device 200.

In an embodiment, the visors 270a and 270b may adjust a transmittance amount of external light incident on the user's eyes according to a transmittance. The visors 270a and 270b may be positioned in front of or behind the screen display portions 215a and 215b. A front side of the screen display portions 215a and 215b may refer, for example, to a direction opposite to the user wearing the wearable AR device 200, and a rear side thereof may refer, for example, to a direction of the user wearing the wearable AR device 200. The visors 270a and 270b may protect the screen display portion 215a and 215b and adjust a transmittance amount of external light.

For example, the visors 270a and 270b may include an electrochromic element that changes color according to applied power to adjust a transmittance. Electrochromism is a phenomenon in which an applied power triggers an oxidation-reduction reaction which causes a change in color. The visors 270a and 270b may adjust a transmittance of external light, using the color changing properties of the electrochromic element.

For example, the visors 270a and 270b may include a control module and an electrochromic element. The control module may control the electrochromic element to adjust a transmittance of the electrochromic element.

Figure 3:
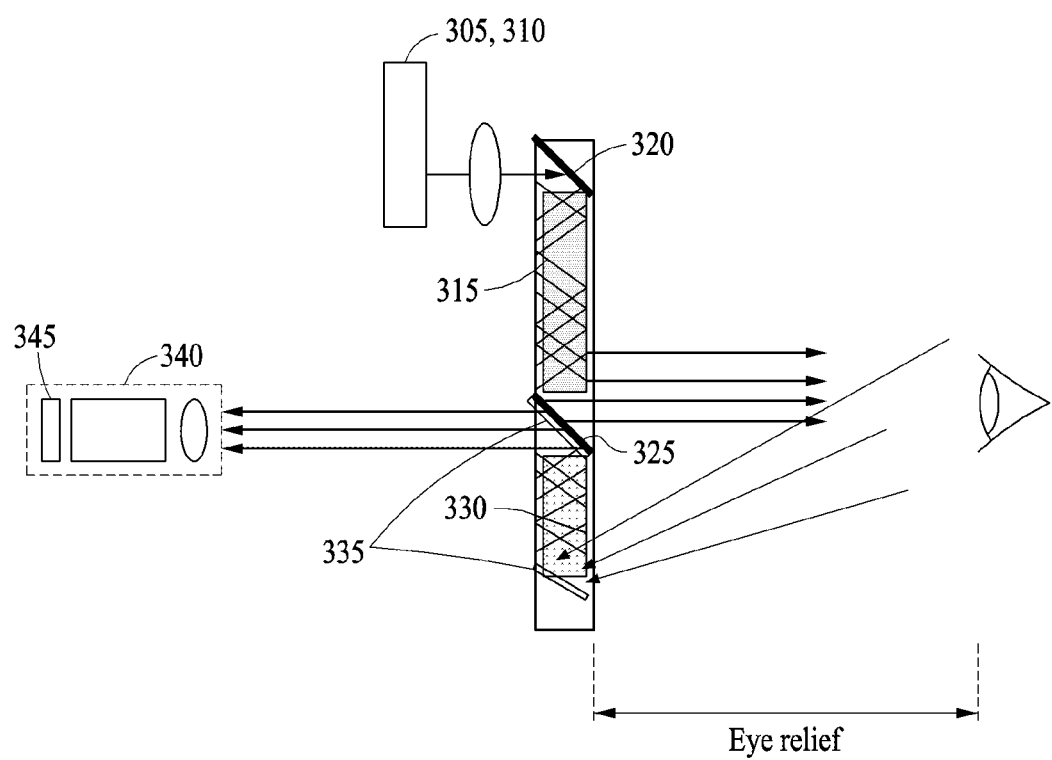
FIG. 3 is a diagram illustrating a camera and an eye tracking sensor of an example wearable AR device according to various embodiments.

FIG. 3 is a diagram illustrating a camera and an ET sensor of an example wearable AR device according to various embodiments.

Referring to FIG. 3, a wearable AR device (e.g., the wearable AR device 200 of FIG. 2) may include displays 305 and 310 (e.g., the displays 205 and 210 of FIG. 2), an optical waveguide (or a waveguide) 315, an input optical member 320 (e.g., the input optical member 220 of FIG. 2), an output optical member 325, an ET optical waveguide (or an ET waveguide) 330, an ET splitter 335, a camera 340

(e.g., the second cameras 275a and 275b), an ET sensor 345, and a lighting unit (e.g., the lighting units 230a and 230b of FIG. 2).

Referring to FIG. 3, light output from the displays 305 and 310 of the wearable AR device is incident to the input optical member 320 and transmitted to the user's eyes through the optical waveguide 315 and the output optical member 325.

Referring to FIG. 3, the camera 340 may obtain an image of the user's eye. For example, the image of the user's eye may be input to the ET splitter 335 on the lower side and transmitted to the ET splitter 335 on the upper side through the ET optical waveguide 330. The camera 340 may obtain the image of the user's eye from the ET splitter 335 on the upper side.

The lighting unit according to an embodiment may output IR light to a user's pupil region. The IR light may be reflected from the user's pupil and transmitted to the ET splitter 335 together with the image of the user's eye. The image of the user's eye obtained by the camera 340 may include the reflected IR light. The ET sensor 345 may sense the IR light reflected from the user's pupil.

An electronic device according to an embodiment (e.g., the electronic device 101 of FIG. 1) may be the wearable AR device 200 shown in FIG. 2 or the wearable AR device shown in FIG. 3, but is not limited thereto. Examples thereof may be various types of electronic devices, such as a smart watch, a smartphone, and a tablet personal computer (PC).

Figure 4:
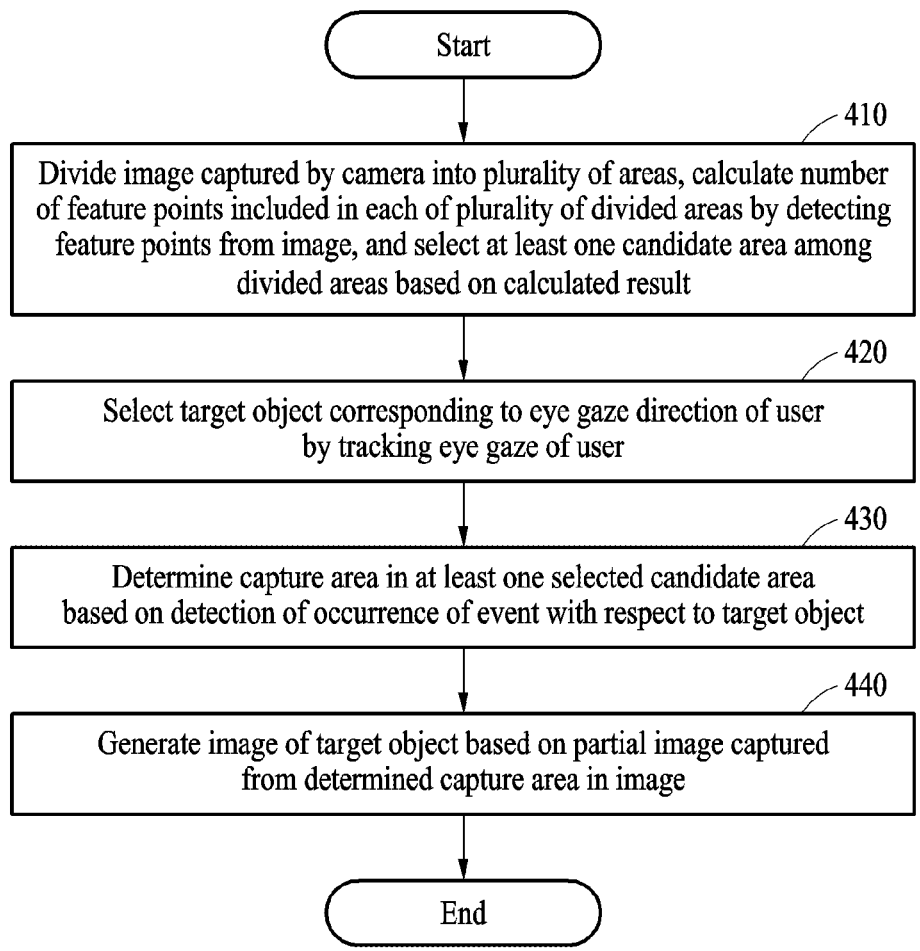
FIG. 4 is a flowchart illustrating an example operation of obtaining an image of a target object according to various embodiments.

FIG. 4 is a flowchart illustrating an example operation of obtaining an image of a target object according to various embodiments.

In operation 410, the electronic device (e.g., the electronic device 101 of FIG. 1 or the wearable AR device 200 of FIG. 2) may divide an image captured by a camera into a plurality of areas, calculate a number of feature points included in each of the divided areas by detecting the feature points from the image, and select at least one candidate area among the divided areas based on a result of the calculating. The feature point may refer, for example, to a point with a feature in an image and the feature point may be used to compare images. The feature point may represent the coordinates of an object in a manner that is not affected by a scale and a rotation of the image, and may have information on at least one of a brightness, a color, or a size regarding a relationship with adjacent pixels. For example, the electronic device may detect a point corresponding to a corner of an object identified in the image as a feature point. The electronic device may select at least one candidate area including a small number of feature points from among the divided areas.

In operation 420, the electronic device may select a target object corresponding to an eye gaze direction of a user by tracking an eye gaze of the user. For example, the electronic device may identify at least one real object from an image captured by a camera (e.g., the camera module 180 of FIG. 1 or the first cameras 245a and 245b of FIG. 2) and select one real object among the at least one identified real object as the target object. For another example, the electronic device may generate a new image by augmenting a virtual object in an image captured by the camera, and identify at least one of a real object or the augmented virtual object from the generated new image. The electronic device may select the at least one identified object of the real object or the augmented virtual object as the target object. For still another example, the electronic device may generate a virtual image including a virtual object and identify at least one virtual object from the generated virtual image. The electronic device may select one of the at least one identified virtual object as the target object. That is, the electronic device may select a real object or a virtual object as the target object. Hereinafter, it is mainly described that the electronic device generates an image of a target object by selecting a real object identified from an image captured by the camera as the target object, but the disclosure is not limited in this respect, and the electronic device may generate an image of a target object by selecting a virtual object identified from a virtual image as the target object. For example, the electronic device may be a wearable AR device which may be worn on the user's head (e.g., the wearable AR device 200 of FIG. 2), but the disclosure is not limited in this respect.

In operation 430, the electronic device may determine a capture area in the at least one selected candidate area based on detection of the occurrence of an event with respect to the target object. The capture area may indicate, for example, an area for capturing a target object in an image. The electronic device may set an area optimized to capture the target object in the image as the capture area. The electronic device may determine a position and/or size of the capture area in the image in various ways, which will be described below.

In operation 440, the electronic device may obtain a partial image captured from the determined capture area in the image. The electronic device may generate an image of the target object based on the obtained partial image. For example, the electronic device may obtain the partial image from a time point when the target object enters the capture area and may generate an image of the target object by postprocessing the obtained partial image.

Figure 5:
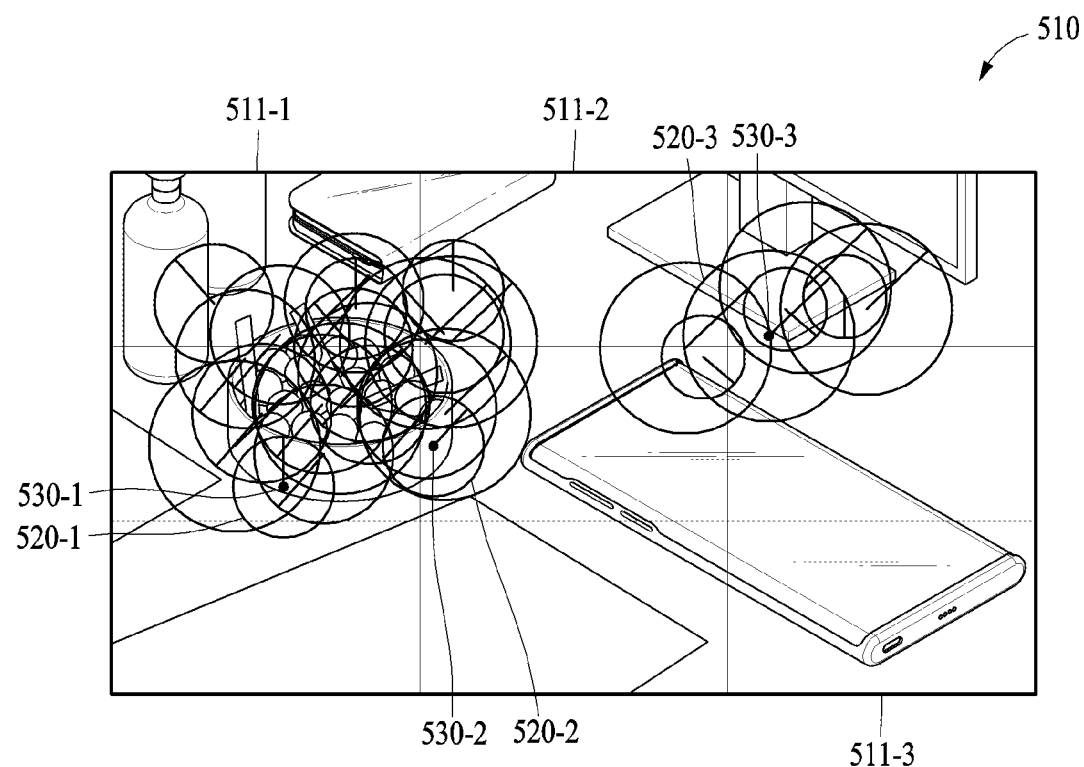
FIG. 5 is a diagram illustrating an example process of detecting feature points in an image according to various embodiments.

FIG. 5 is a diagram illustrating an example process of detecting feature points in an image according to various embodiments.

The electronic device according to an embodiment (e.g., the electronic device 101 of FIG. 1 or the wearable AR device 200 of FIG. 2) may divide an image 510 captured by a camera (e.g., the camera module 180 of FIG. 1 or the first cameras 245a and 245b of FIG. 2) into a plurality of areas 511-1, 511-2, and 511-3. FIG. 5 illustrates an example in which the electronic device divides the image 510 into 3×3 areas, but the disclosure is not limited in this respect. The electronic device may divide an image into a×b areas. In this example, "a" and "b" may be a natural number greater than or equal to "1". Hereinafter, for convenience of description, it is mainly described that the electronic device divides an image into 3×3 areas.

The electronic device may detect feature points from the image 510. The electronic device may detect the feature points using a feature point detecting algorithm. Referring to FIG. 5, the electronic device may detect a plurality of feature points 530-1, 530-2, and 530-3 from the image 510 using the feature point detecting algorithm. For example, the electronic device may detect a plurality of circles 520-1, 520-2, and 520-3 from the image 510 using the feature point detecting algorithm, and detect centers of the detected respective circles 520-1, 520-2, and 520-3 as the feature points 530-1, 530-2, and 530-3.

Figure 6:
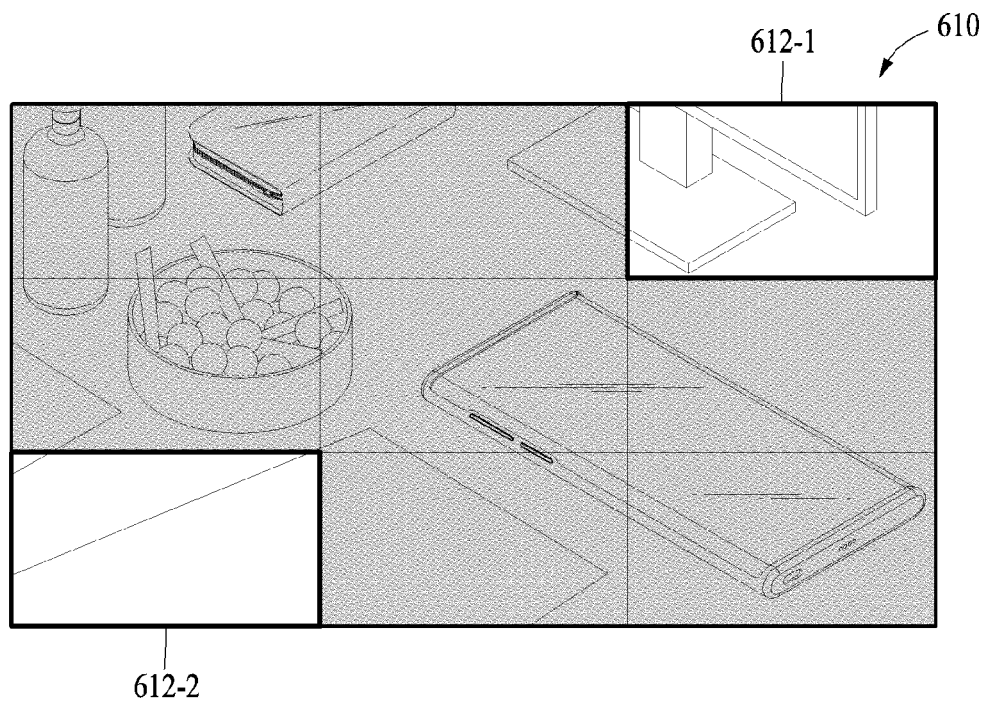
FIG. 6 is a diagram illustrating an example process of selecting at least one candidate area based on the number of feature points among a plurality of divided areas according to various embodiments.

FIG. 6 is a diagram illustrating an example process of selecting at least one candidate area based on the number of feature points among a plurality of divided areas according to various embodiments.

An electronic device according to an embodiment (e.g., the electronic device 101 of FIG. 1 or the wearable AR device 200 of FIG. 2) may divide an image 610 into a plurality of areas. The electronic device may calculate the number of feature points included in each of the divided areas by detecting the feature points from the image 610.

The electronic device may select at least one of candidate area 612-1 or 612-2 having a small number of feature points from the plurality of areas.

According to an embodiment, the electronic device may select, as the candidate area, some divided areas including a relatively small number of feature points among the divided areas. The electronic device may select, as the candidate area, an area including the smallest number of feature points among all the divided areas. For another example, the electronic device may calculate an average number of the feature points included in each of all the divided areas, and select, as the candidate area, at least one divided area including feature points less than or equal to the calculated average number.

According to an embodiment, the electronic device may select, as the candidate area, some divided areas including an small absolute number of feature points among the divided areas. For example, the electronic device may select, as the candidate area, at least one divided area including feature points less than or equal to a threshold number (e.g., five) among all the divided areas.

Figure 7:
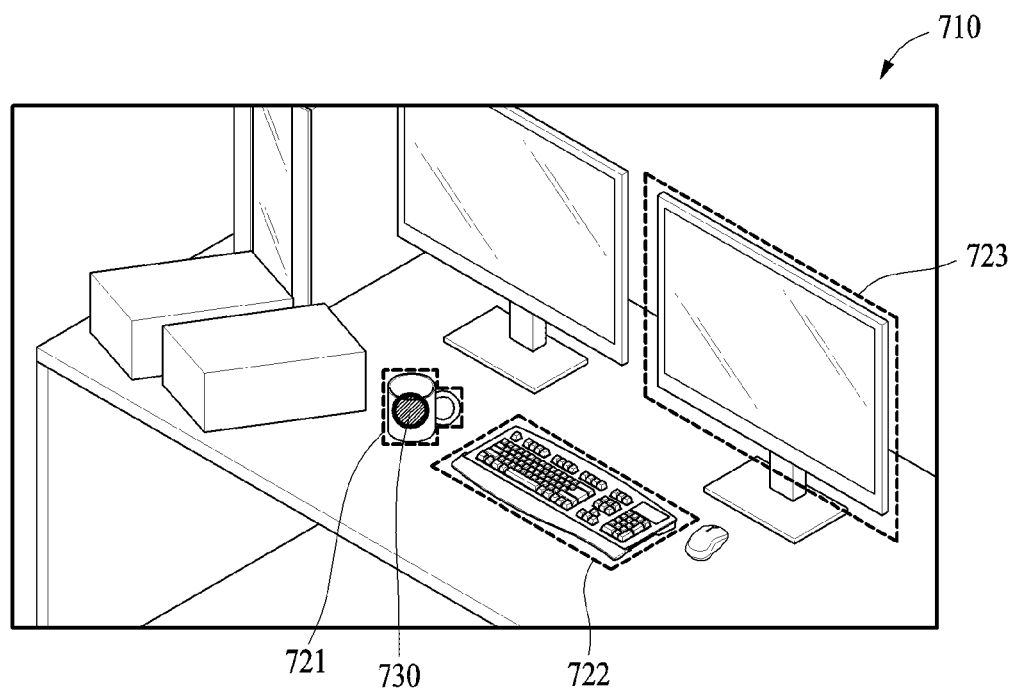
FIG. 7 is a diagram illustrating an example process of selecting a target object according to various embodiments.

FIG. 7 is a diagram illustrating an example process of selecting a target object according to various embodiments.

The electronic device may identify objects 721, 722, and 723 in an image 710. As described above, the object may be a real object or a virtual object. For example, as shown in FIG. 7, the object 721, the object 722, and the object 723 may represent a cup, a keyboard, and a monitor, respectively.

An electronic device according to an embodiment (e.g., the electronic device 101 of FIG. 1 or the wearable AR device 200 of FIG. 2) may track the eye gaze of the user and select a target object corresponding to the eye gaze direction of the user. The electronic device may further include an ET camera (e.g., the second cameras 275a and 275b of FIG. 2) for tracking the eye gaze direction of the user. The ET camera may detect and track the user's pupil or the user's iris, and may track the eye gaze direction of the user based on a tracking result. The electronic device may select an object corresponding to the eye gaze direction of the user as the target object. For example, the electronic device may output the image 710 to a display (e.g., the display module 160 of FIG. 1). The electronic device may detect an eye gaze area 730 corresponding to the eye gaze direction of the user from the image 710 by tracking the eye gaze of the user who is looking at the image 710 output to the display through the ET camera. The electronic device may detect object areas in which the objects 721, 722, and 723 identified in the image 710 are displayed, respectively. The electronic device may detect an object (e.g., the object 721) corresponding to an object area overlapping at least a portion of the eye gaze area 730 corresponding to the eye gaze direction of the user, as a target object corresponding to the eye gaze direction of the user.

Figure 8:
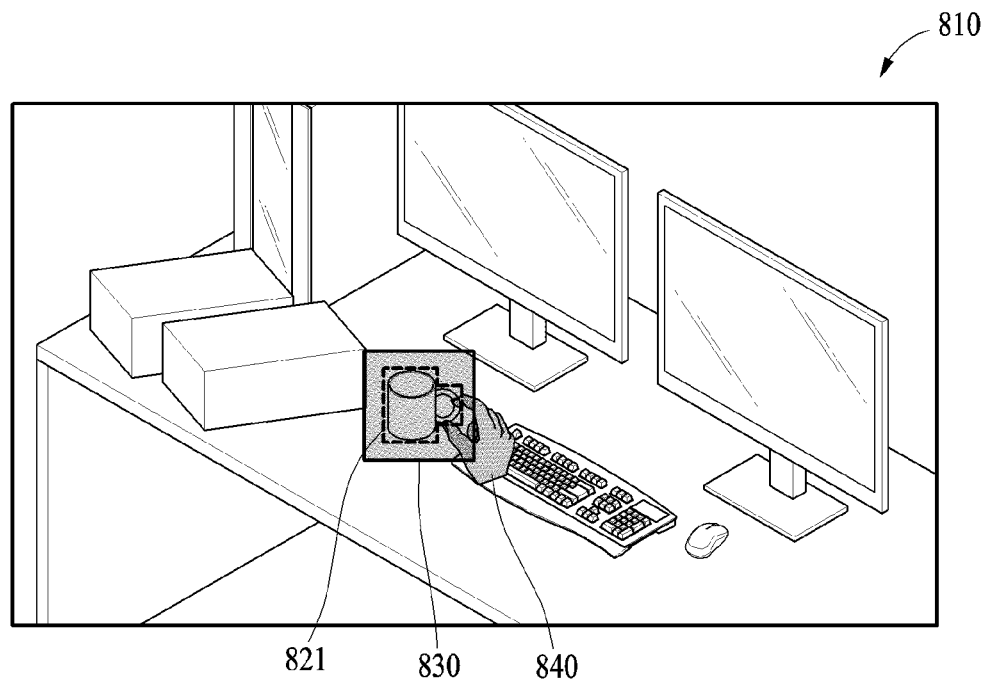
FIGS. 8 and 9 are diagrams illustrating example detection of occurrence of an event associated with a user's gesture according to various embodiments.
Figure 9:
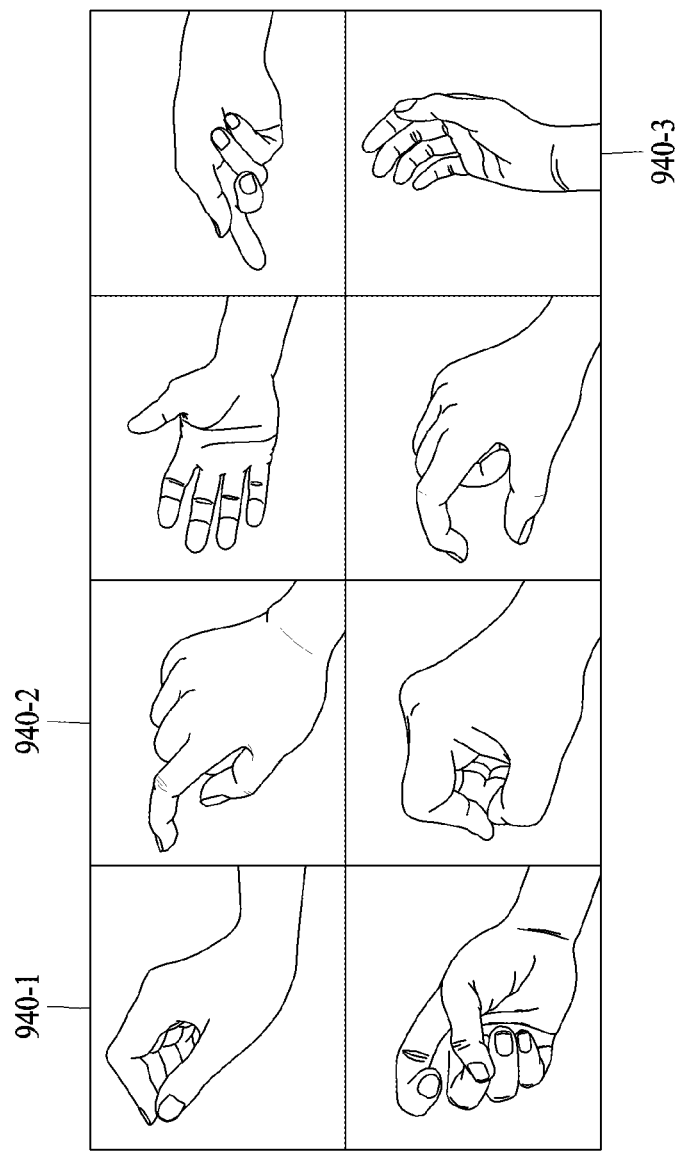

FIGS. 8 and 9 are diagrams illustrating example detection of the occurrence of an event associated with a user's gesture according to various embodiments.

An electronic device according to an embodiment (e.g., the electronic device 101 of FIG. 1 or the wearable AR device 200 of FIG. 2) may detect the occurrence of an event based on the detection of a user's gesture associated with a target object. The electronic device may detect a user's gesture associated with a target object from an image 810. The user's gesture may represent, for example, a user's hand gesture, but is not limited thereto. The electronic device may extract the user's hand gesture by analyzing a form of the user's hand from the image 810. More specifically, the electronic device may detect a user's gesture with respect to a target object which enters an event detection area surrounding an object area, in which the target object is displayed, and detect the occurrence of an event in response to the detected user's gesture which has the same form as one of hand gestures pre-stored in the electronic device.

In the example of FIG. 8, the electronic device may select, as the target object, an object 821 (e.g., a "cup") corresponding to the eye gaze direction of the user. The electronic device may generate an event detection area 830 surrounding the object area, in which the target object (e.g., the object 821) is displayed. The event detection area 830 may include an area corresponding to the target object (e.g., the object 821). The event detection area may have, for example, a rectangular shape, but is not limited thereto, and may have other shapes such as a circle. For example, a size of the event detection area may be approximately twice as large as a size of an object area, in which a target object is displayed, but the size of the event detection area is not limited thereto.

The electronic device may determine a user's gesture detected before detecting the occurrence of the event, as a user's gesture associated with the target object. As described below, the electronic device may detect the occurrence of an event and determine a user's gesture detected after a capture area is determined, as a user's gesture associated with the capture area.

The electronic device may detect the occurrence of an event in response to a detected user's gesture 840 associated with the target object which has the same form as one of the hand gestures pre-stored in the electronic device. The electronic device may pre-store various forms of hand gestures. For example, as shown in FIG. 9, the electronic device may pre-store various hand gestures 940-1, 940-2, and 940-3. For example, each of the hand gestures 940-1, 940-2, and 940-3 stored in the electronic device may show a hand gesture in the form of holding or raising an object. The hand gestures pre-stored in the electronic device are not limited to the hand gestures shown in FIG. 9. The electronic device may compare the user's gesture with the forms of the pre-stored hand gestures, considering not only the forms of the pre-stored hand gestures, but also forms of the pre-stored hand gestures, which are changed according to rotations thereof. For example, the electronic device may detect the occurrence of an event, even when a form of one pre-stored hand gesture which is changed according to a rotation has the same form as the user's gesture.

Figure 10:
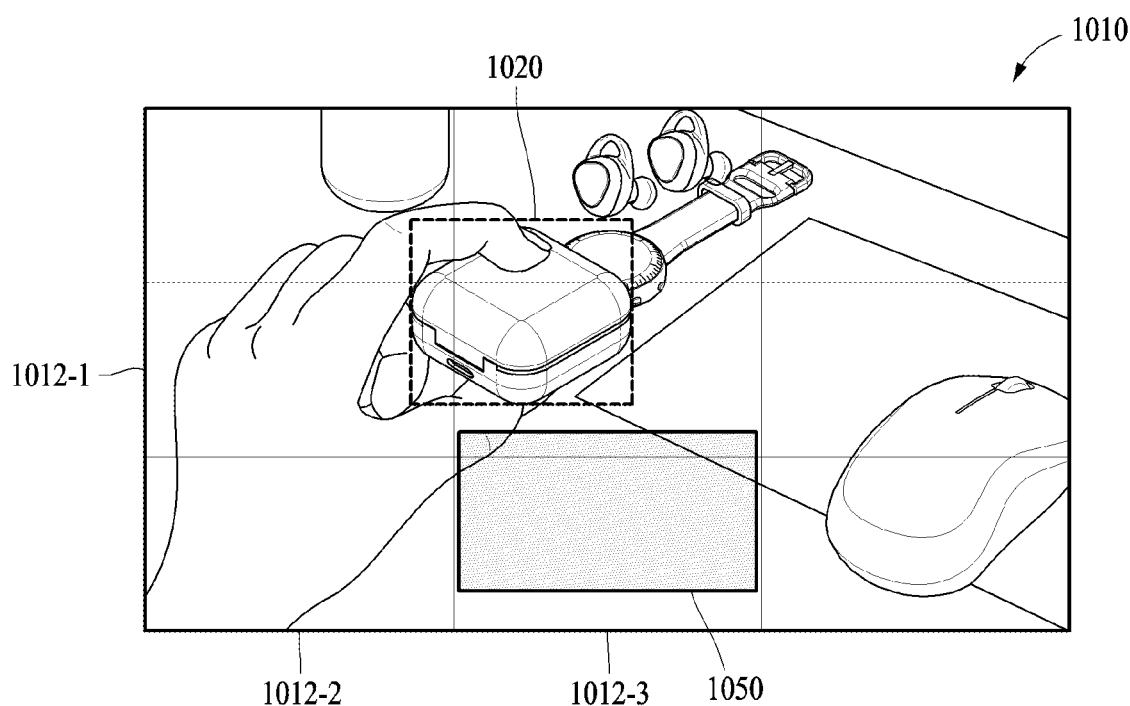
FIG. 10 is a diagram illustrating an example process of determining a capture area according to various embodiments.

FIG. 10 is a diagram illustrating an example process of determining a capture area according to various embodiments.

The electronic device according to an embodiment (e.g., the electronic device 101 of FIG. 1 or the wearable AR device 200 of FIG. 2) may determine a capture area in the at least one selected candidate area, based on the detection of the occurrence of an event. The electronic device may determine the capture area in the at least one candidate area based on at least one of color information on an object area, in which a target object is displayed, a user's preferred area in an image, feature points detected from the image, or a probability value that the target object is classified as a corresponding object, or a combination of two or more thereof.

In the example of FIG. 10, the electronic device may divide an image 1010 into a plurality of areas and select candidate areas 1012-1, 1012-2, and 1012-3 from among the plurality of divided areas based on complexity. In addition, the electronic device may select a target object 1020 from the image 1010. The electronic device may determine a position and size of a capture area 1050 in the selected candidate areas 1012-1, 1012-2, and 1012-3.

According to various embodiments, the electronic device may determine a capture area in the selected candidate areas 1012-1, 1012-2, and 1012-3 based on color information on the object area, in which the target object 1020 is displayed. The electronic device may calculate the color information on the object area, in which the target object 1020 is displayed, in the image 1010. For example, the electronic device may calculate, as color information, an average color of pixels included in the object area, in which the target object 1020 is displayed, and calculate, as color information, a color histogram of pixels included in the object area, in which the target object 1020 is displayed. The color histogram herein may represent a distribution for each color. For example, the electronic device may designate an arbitrary area having a predetermined size in the selected candidate areas 1012-1, 1012-2, and 1012-3. The electronic device may calculate color information on the designated area and compare it with the color information on the object area, in which the target object 1020 is displayed. The electronic device may give, to the designated area, a first score associated with the color information based on a comparison result. The electronic device may give a lower first score based on the color information on the designated area being similar to the color information on the object area, in which the target object 1020 is displayed, and may give a higher first score based on the color information on the designated area being not similar to the color information on the object area, in which the target object 1020 is displayed. For example, the electronic device may determine, as the capture area, an area having the highest first score associated with the color information in the candidate areas 1012-1, 1012-2, and 1012-3 based on the color information on the object area, in which the target object 1020 is displayed.

According to an embodiment, the electronic device may determine the capture area in the selected candidate areas 1012-1, 1012-2, and 1012-3 based on a user's preferred area in the image 1010. For example, the electronic device may receive, from the user in advance, an area in the image that the user prefers to capture the target object. For example, the electronic device may designate an arbitrary area having a predetermined size in the selected candidate areas 1012-1, 1012-2, and 1012-3. The electronic device may compare positions between the designated area and the user's preferred area. The electronic device may give, to the designated area, a second score associated with user preference based on a comparison result. For example, the electronic device may give a higher second score based on the designated area being closer to the user's preferred area, and may give a lower second score based on the designated area being further away from the user's preferred area. The electronic device may determine, as the capture area, an area having the highest second score in the candidate areas 1012-1, 1012-2, and 1012-3 based on the user's preferred area.

According to an embodiment, the electronic device may determine the capture area in the candidate areas 1012-1, 1012-2, and 1012-3 based on feature points detected in the image 1010. For example, the electronic device may designate an arbitrary area having a predetermined size in the selected candidate areas 1012-1, 1012-2, and 1012-3. The electronic device may give, to the designated area, a third score associated with the number of feature points based on the number of feature points detected in the designated area. The electronic device may give a lower third score based on there being a large number of feature points detected in the designated area, and may give a higher third score based on there being a small number of feature points detected in the designated area. For example, the electronic device may determine, as the capture area, an area having the highest third score in the candidate areas 1012-1, 1012-2, and 1012-3 based on the feature points detected in the image.

According to an embodiment, the electronic device may calculate a final score based on the first score, the second score, and the third score for each designated area in the candidate areas 1012-1, 1012-2, and 1012-3. The electronic device may calculate a final score by applying a first weight, a second weight, and a third weight respectively to the first score, the second score, and the third score calculated for the designated area. For example, the electronic device may, with respect to the designated area, apply the first weight to the first score, apply the second weight to the second score, apply the third weight to the third score, and add all the scores to calculate the final score for the designated area. The electronic device may determine, as the capture area, an area having the highest final score in the candidate areas 1012-1, 1012-2, and 1012-3.

According to an embodiment, the electronic device may determine a capture area in the selected candidate areas 1012-1, 1012-2, and 1012-3 further considering a probability value that the target object 1020 is classified as a corresponding object. For example, the electronic device may determine an object corresponding to the target object 1020 as a "wireless charging case". The electronic device may calculate a probability value that the target object 1020 is classified as the "wireless charging case". When the probability value that the target object 1020 is classified as the "wireless charging case" is greater than a threshold probability value, the electronic device may determine that it is easy to recognize the target object 1020 and may reduce an effect of a background of the image at the time of determining the capture area. When the probability value that the target object 1020 is classified as the "wireless charging case" is less than or equal to the threshold probability value, the electronic device may determine that it is not easy to recognize the target object 1020 and may increase the effect of the background of the image at the time of determining the capture area. The effect of the background of the image herein may indicate, for example, an effect of a color of the image and feature points in the image. That is, the electronic device may adjust a weight corresponding to each of the first score associated with the color information and the third score associated with the number of feature points. For example, the electronic device may increase the weights for the first score and the third score when the effect of the background of the image is increased, and may reduce the weights for the first score and the third score when the effect of the background is reduced. For example, when the target object 1020 has a standard shape of a corresponding object, the electronic device may calculate a high probability value that the target object 1020 is classified as the corresponding object, and when the target object 1020 has a non-standard shape of the corresponding object, the electronic device may calculate a low probability value that the target object 1020 is classified as the corresponding object.

According to an embodiment, the electronic device may redetect the feature points in the image after detecting the occurrence of an event. Based on detection of movement of a camera, the electronic device may recalculate the number of feature points included in each of the plurality of divided areas by redetecting the feature points in the image after detecting the occurrence of an event, and reselect at least one candidate area among the plurality of divided areas based on the recalculated result. For example, based on detection of a global motion in the image, the electronic device may redetect feature points in the image after detecting the occurrence of an event, recalculate the number of feature points included in each of the plurality of areas, and reselect a candidate area. The global motion may represent movement of all objects and a background from an image frame at a first time point to an image frame at a second time point of the image. On the other hand, a local motion may represent movement of an object or a background in a specific area from the first image frame at the first time point to the image frame at the second time point. For example, the global motion may occur by the movement of the camera and local motion may occur regardless of the movement of the camera. When the electronic device detects the global motion in the image, the positions of the objects and the background may be different between the image frame at the time point before detecting the occurrence of an event and the image frame at the time point after detecting the occurrence of an event, and the positions and the number of feature points in the image may be changed. Therefore, the electronic device may reflect changes of the positions of the objects and the background in the image by redetecting the feature points in the image frame at the time point after detecting the occurrence of an event and reselecting the candidate area.

Figure 11:
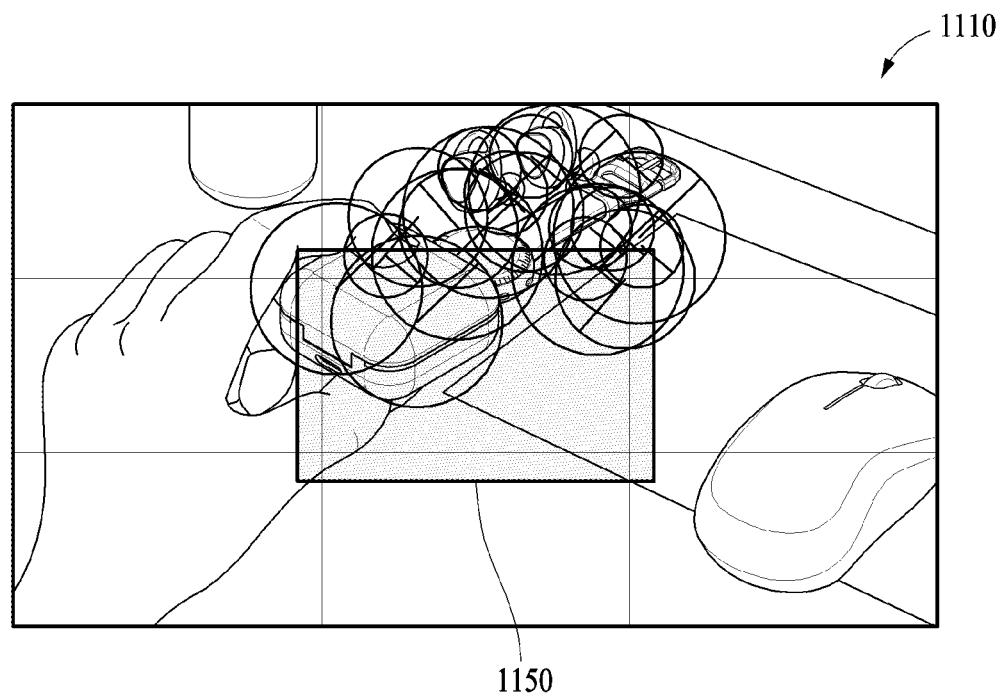
FIG. 11 is a diagram illustrating an example process of calculating a noise level in a capture area according to various embodiments.

FIG. 11 is a diagram illustrating an example process of calculating a noise level in a capture area according to various embodiments.

The electronic device according to an embodiment (e.g., the electronic device 101 of FIG. 1 or the wearable AR device 200 of FIG. 2) may determine a capture area 1150 in an image 1110. The electronic device may calculate the level of noise in the capture area 1150 of the image 1110. Here, the noise may indicate a degree to which an area is difficult to be used as a capture area. The electronic device may determine that the area is not suitable to be used as the capture area, based on the noise being large, and may determine that the area is suitable to be used as the capture area, based on the noise being small. The electronic device may calculate the noise level in the capture area based on the number of feature points detected in the capture area, color information on the object area, in which the target object is displayed, and/or a probability value that the target object is classified as a corresponding object. When the noise level in the capture area is greater than or equal to a threshold noise level, the electronic device may display, on the display, at least one of a warning message or information guiding positional movement of the capture area.

In the example of FIG. 11, the electronic device may calculate the noise level in the capture area 1150 determined in the image 1110. When the noise level calculated in the capture area 1150 is greater than or equal to the threshold noise level, the electronic device may determine that the capture area 1150 is at an unfavorable position for object registration. In this case, the electronic device may output, to the display, at least one of a warning message indicating that the capture area 1150 is unfavorable to the object registration or information guiding positional movement of the capture area 1150.

Figure 12:
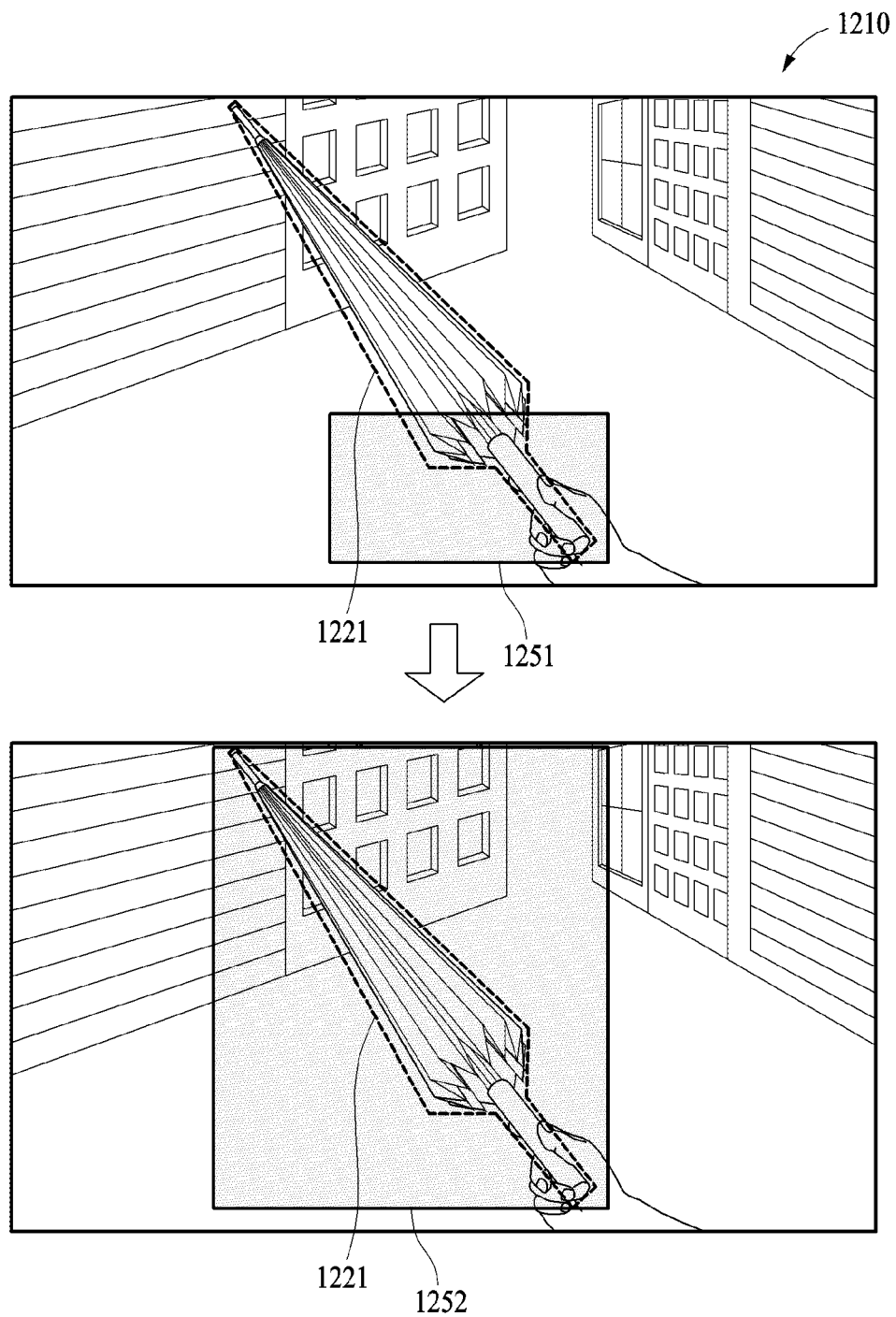
FIG. 12 is a diagram illustrating an example size change of a capture area according to various embodiments.

FIG. 12 is a diagram illustrating an example size change of a capture area according to various embodiments.

The electronic device according to an embodiment (e.g., the electronic device 101 of FIG. 1 or the wearable AR device 200 of FIG. 2) may change a position and size of a capture area. The electronic device may compare an object area, in which a target object is displayed, with a capture area. When the electronic device determines that the target object is out of the capture area based on the comparison result, the electronic device may change at least one of a position or size of the capture area such that the capture area includes the object area, in which the target object is displayed. In the example of FIG. 12, the electronic device may select a target object 1221 from an image 1210 and determine a capture area 1251. The electronic device may compare the object area, in which the target object 1221 is displayed, with the capture area 1251, and determine that the target object 1221 is out of the capture area 1251 when the capture area 1251 does not include at least a portion of the object area, in which the target object 1221 is displayed. The electronic device may change at least one of the position or size of the capture area 1251 such that the capture area 1251 includes the object area, in which the target object 1221 is displayed. FIG. 12 illustrates that the electronic device changes the capture area 1251 to a capture area 1252 to include the object area, in which the target object 1221 is displayed.

Figure 13:
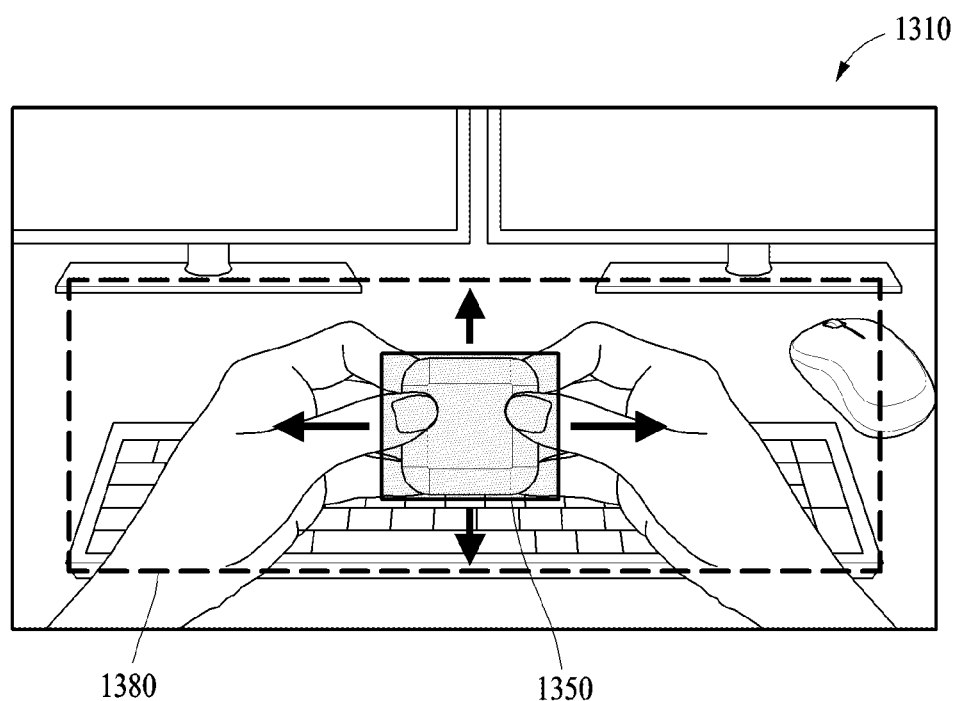
FIG. 13 is a diagram illustrating an example positional change of a capture area according to various embodiments.

FIG. 13 is a diagram illustrating an example positional change of a capture area according to various embodiments.

The electronic device according to an embodiment (e.g., the electronic device 101 of FIG. 1 or the wearable AR device 200 of FIG. 2) may change a position of a capture area. The electronic device may divide an image 1310 into a plurality of areas and select a candidate area among the plurality of divided areas. The electronic device may identify a boundary area 1380 which may be used as a capture area among the selected candidate areas. For example, the electronic device may identify the boundary area 1380, which may be used as the capture area, among the candidate areas, based on at least one of color information on an object area, in which a target object is displayed, a user's preferred area in an image, feature points detected in the image, or a probability value that the target object is classified as a corresponding object or a combination of two or more thereof. The electronic device may move the capture area in the boundary area 1380.

In the example of FIG. 13, the electronic device may display information on movable directions of the capture area 1350 around the capture area 1350. For example, the electronic device may display interface objects in the form of arrows around the capture area 1350 based on the boundary area 1380 which may be used as the capture area, the arrows representing that the capture area 1350 may move upwards and downwards and to the right and left.

Figure 14:
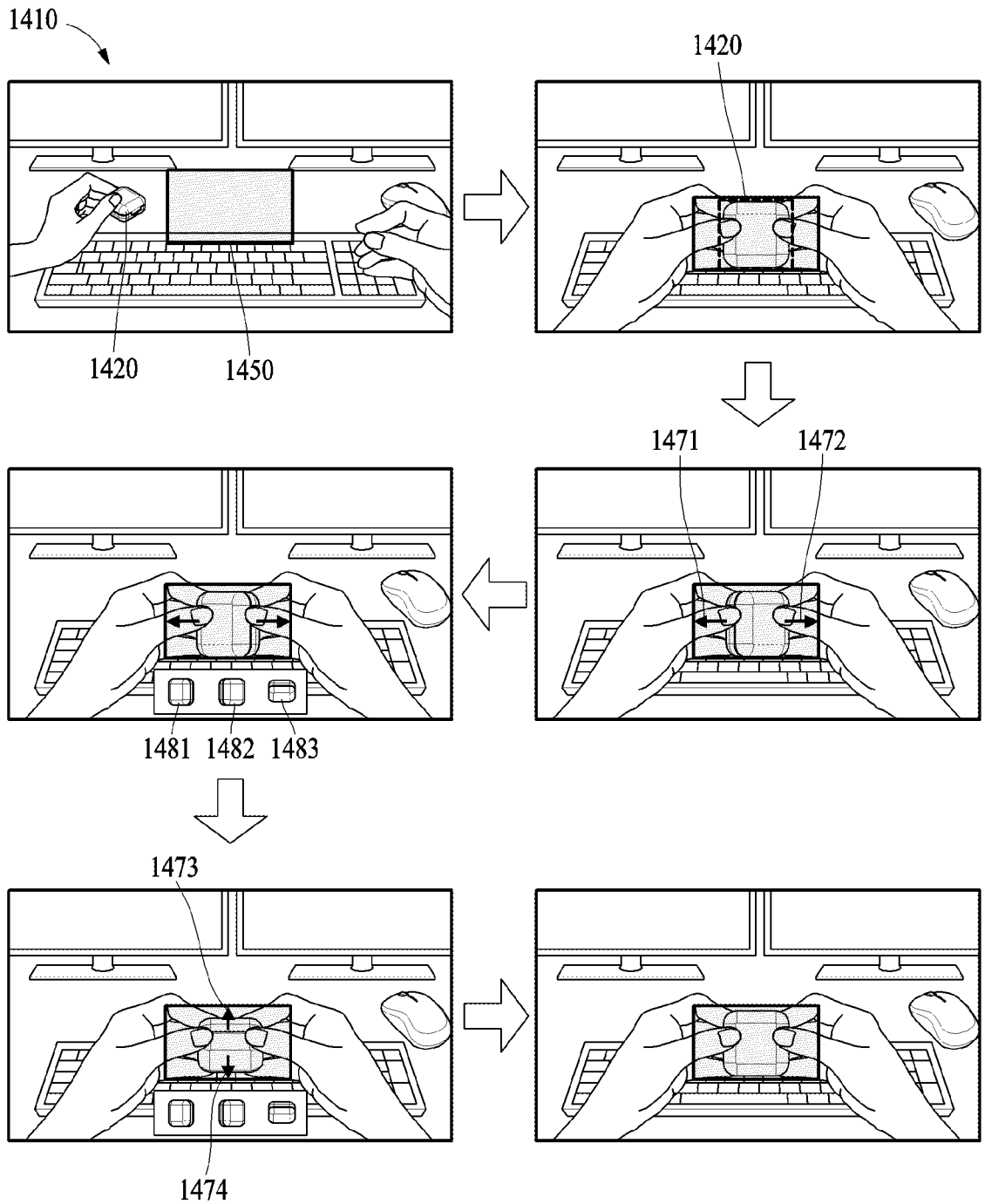
FIG. 14 is a diagram illustrating an example process of providing a rotation guide in a capture area according to various embodiments.

FIG. 14 is a diagram illustrating an example process of providing a rotation guide in a capture area according to various embodiments.

An electronic device according to an embodiment (e.g., the electronic device 101 of FIG. 1 or the wearable AR device 200 of FIG. 2) may provide a rotation guide for obtaining images of a plurality of cross sections of a target object in a capture area. When the target object enters the capture area, the electronic device may display a graphic object for guiding the rotation of the target object on a display which outputs an image 1410. When the rotation of the target object is detected, the electronic device may display, on the display, the images of the plurality of cross sections of the target object captured in the capture area.

In the example of FIG. 14, the electronic device may determine a capture area 1450 in the image 1410. The electronic device may detect that a target object 1420 enters the capture area 1450. When the target object 1420 enters the capture area 1450, the electronic device may display the graphic object for guiding the rotation of the target object 1420 on the display, in order to obtain images of the target object 1420. For example, the electronic device may display graphic objects 1471 and 1472 instructing to rotate the target object 1420 in left and right directions, respectively. When the electronic device detects the rotation of the target object 1420 in the image 1410, the electronic device may obtain the images of the cross sections of the target object 1420 for each image frame from the capture area 1450. The electronic device may further display, on the display, images 1481, 1482, and 1483 of the plurality of cross sections of the target object 1420 at various angles captured from the capture area 1450. When the electronic device determines that the images of the cross sections of the target object 1420 are sufficiently obtained according to the rotation of the target object 1420 in the left and right directions, the electronic device may display, on the display, graphic objects 1473 and 1474 instructing to rotate the target object 1420 in other directions (e.g., the upward and downward directions), respectively. When it is determined that the target object 1420 is disposed at the same angle as the angle before the rotation in the image 1410, the electronic device may end the obtaining of the images of the target object 1420 in the capture area 1450.

Figure 15:
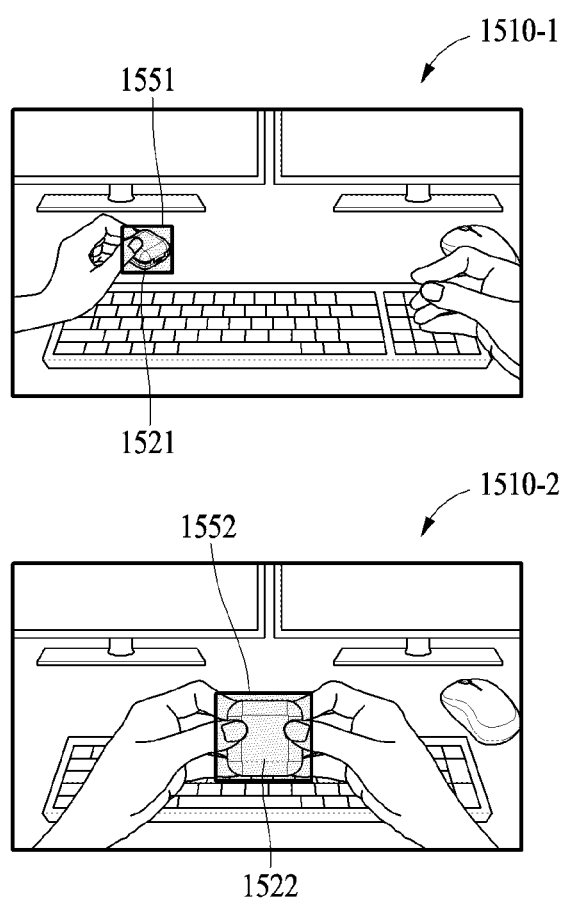
FIG. 15 is a diagram illustrating an example process of determining a position and size of a capture area according to various embodiments.

FIG. 15 is a diagram illustrating an example process of determining a position and size of a capture area according to various embodiments.

The electronic device according to an embodiment (e.g., the electronic device 101 of FIG. 1 or the wearable AR device 200 of FIG. 2) may determine a position and size of a capture area based on a position and size of an object area, in which a target object is displayed. For example, the electronic device may determine the size of the capture area based on the size of the object area, in which the target object is displayed. The electronic device may also increase the size of the capture area when the size of the object area, in which the target object is displayed, in the image increases. For another example, the electronic device may determine the position of the capture area based on the position of the object area, in which the target object is displayed. For example, when the position of the object area, in which the target object is displayed, in the image is changed, the electronic device may also change the position of the capture area.

According to an embodiment, when the movement of the target object is detected in the image, the electronic device may track the object area, in which the target object is displayed, and may change at least one of the position or size of the capture area such that the capture area includes the tracked object area. Referring to FIG. 15, the electronic device may determine a capture area 1551 based on an object area, in which a target object 1521 is displayed, in an image frame 1510-1, and determine a capture area 1552 based on an object area, in which a target object 1522 is displayed, in an image frame 1510-2 at a different time point.

According to an embodiment, the electronic device may determine a shape of the capture area based on a shape of the object area, in which the target object is displayed. For example, when the shape of the object area, in which the target object is displayed, is a circle, the shape of the capture area may also be determined to be a circle.

Figure 16A:
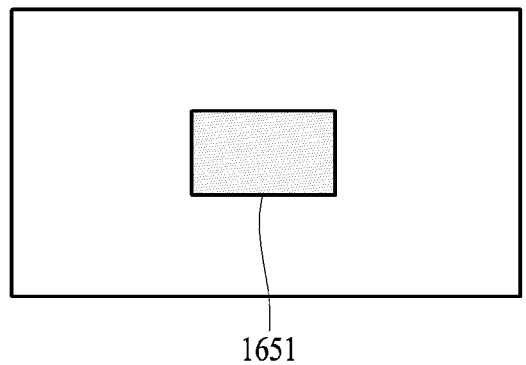
FIGS. 16A and 16B are diagrams illustrating an example process of automatically determining a position and size of a capture area according to various embodiments.
Figure 16A:
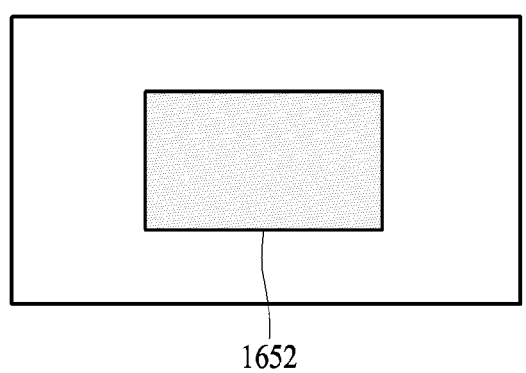
Figure 16A:
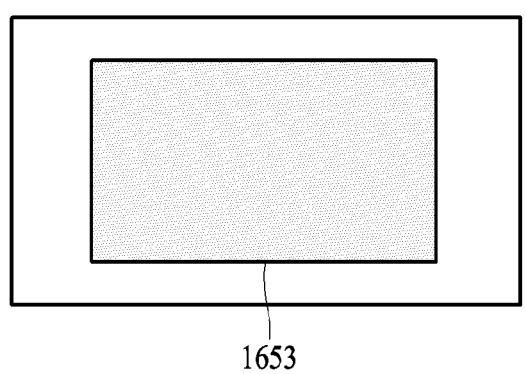
Figure 16B:
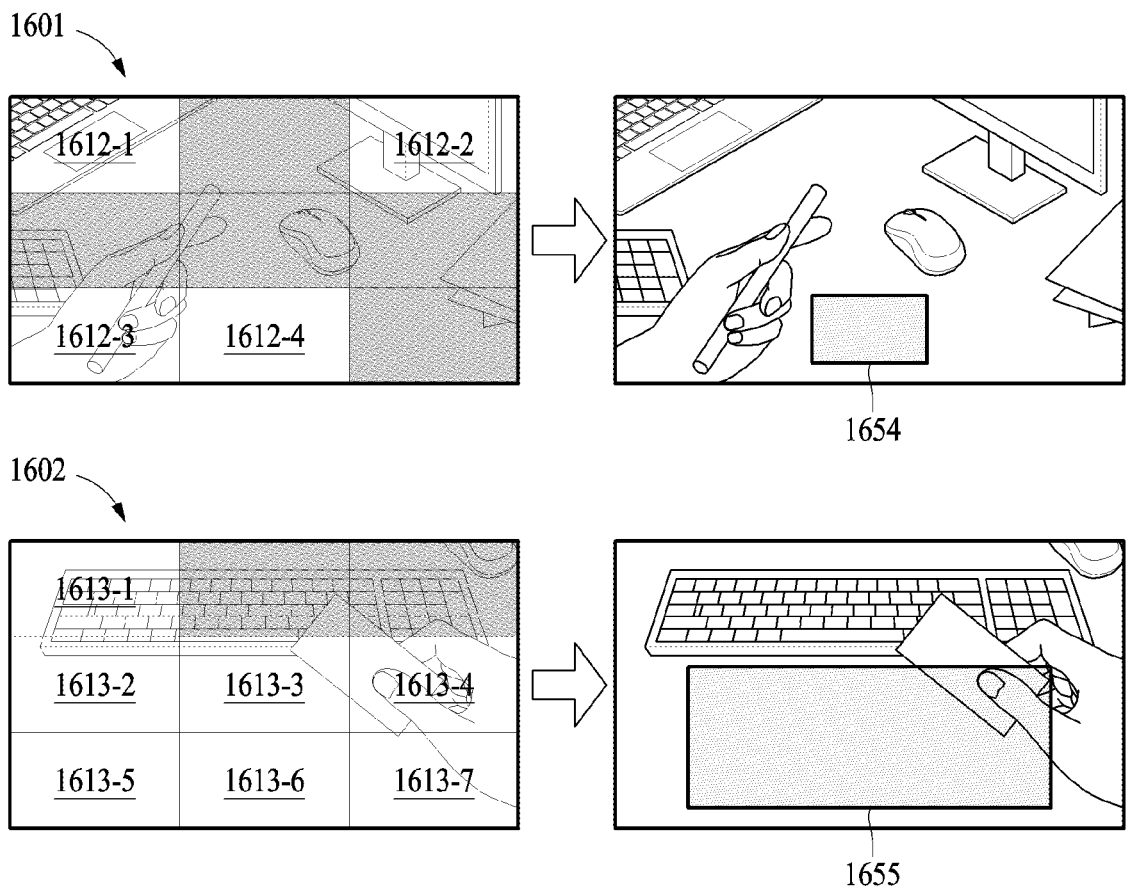

FIGS. 16A and 16B are diagrams illustrating an example process of automatically determining a position and size of a capture area according to various embodiments.

The electronic device according to an embodiment (e.g., the electronic device 101 of FIG. 1 or the wearable AR device 200 of FIG. 2) may automatically determine the position and size of the capture area.

In FIG. 16A, the electronic device may automatically determine a capture area in an image to have a predetermined size at a predetermined position. For example, the electronic device may determine the capture area such that a center of the capture area coincides with a center of the image in the image. The electronic device may determine the capture area having a predetermined size while the center of the image coincides with the center of the capture area in the image. FIG. 16A illustrates a capture area 1651 having a first size, a capture area 1652 having a second size, or a capture area 1653 having a third size. Herein, the second size may be larger than the first size and the third size may be larger than the second size.

In FIG. 16B, the electronic device may divide an image into a plurality of areas and may determine a size of a capture area based on a candidate area selected from among the plurality of divided areas. The electronic device may determine the size of the capture area based on a number of selected candidate areas and positions of the selected candidate areas in the image. For example, the electronic device may increase the size of the capture area based on the number of selected candidate areas being large, and may decrease the size of the capture area based on the number of adjacent candidate areas being small. As shown in FIG. 16B, when the number of candidate areas 1612-1, 1612-2, 1612-3, and 1612-4 selected among a plurality of areas in an image 1601 is four and only two of the selected candidate areas are adjacent to each other, the electronic device may determine a capture area 1654 having a fourth size in the selected candidate areas. When the number of candidate areas 1613-1, 1613-2, 1613-3, 1613-4, 1613-5, 1613-6, and 1613-7 selected in an image 1602 is seven and all of the selected candidate areas are adjacent to each other, the electronic device may determine a capture area 1655 having a fifth size in the selected candidate areas. Herein, the fifth size may be larger than the fourth size.

Figure 17A:
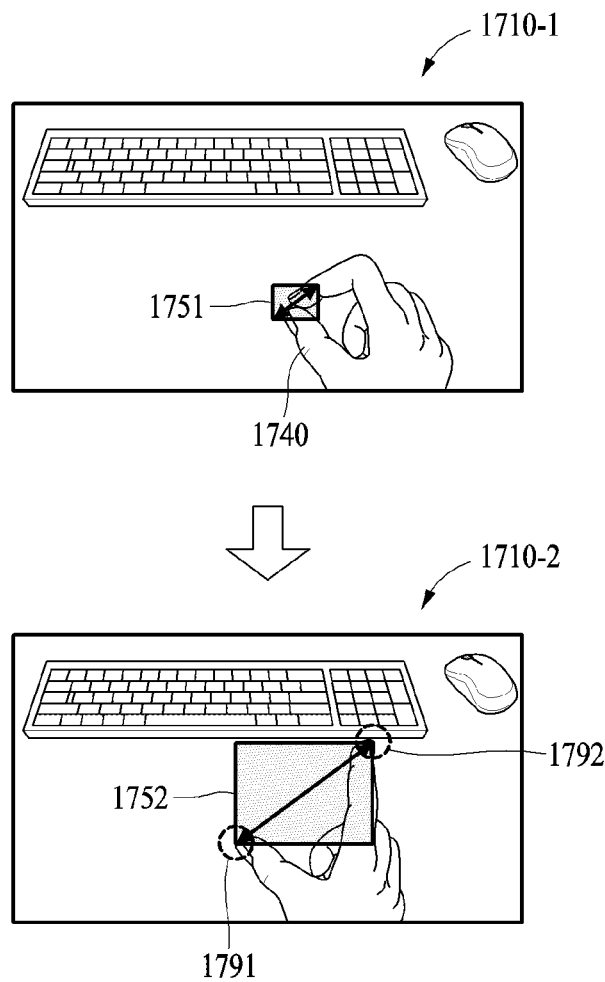
FIGS. 17A and 17B are diagrams illustrating an example process of determining a position and size of a capture area based on a user's gesture according to various embodiments.
Figure 17B:
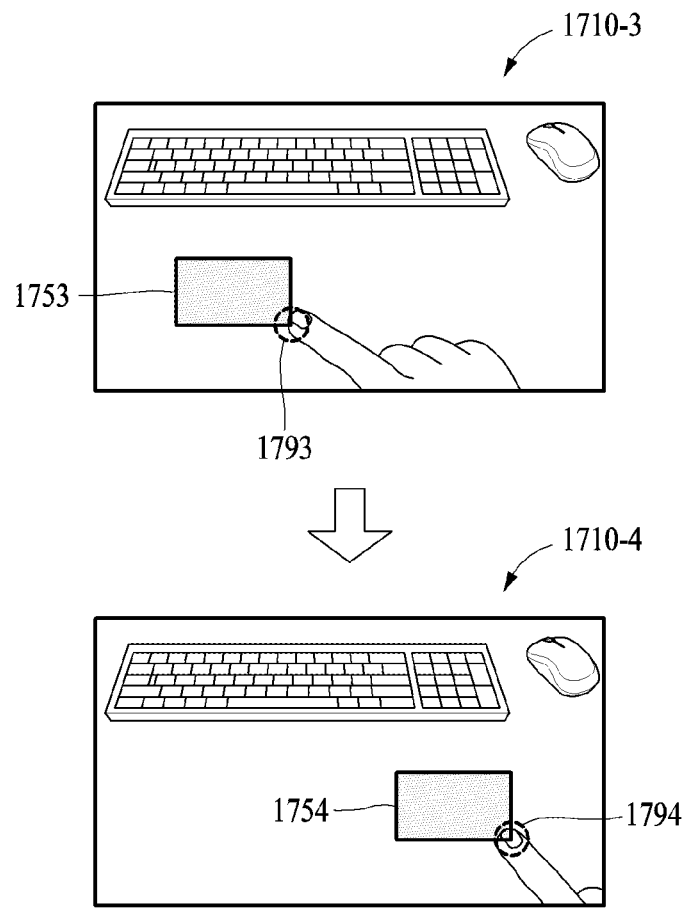

FIGS. 17A and 17B are diagrams illustrating an example process of determining a position and size of a capture area based on a user's gesture according to various embodiments.

The electronic device according to an embodiment (e.g., the electronic device 101 of FIG. 1 or the wearable AR device 200 of FIG. 2) may determine a position and size of a capture area based on a user's gesture. When the electronic device recognizes the user's gesture associated with the capture area, the electronic device may change at least one of the position or size of the capture area based on the recognized user's gesture.

FIG. 17A illustrates an example in which the electronic device changes the size of the capture area in the image based on the user's gesture. The electronic device may determine a capture area 1751 in an image frame 1710-1 at a time point A and recognize a user's hand gesture 1740 entering the determined capture area 1751. For example, when a form of the user's hand gesture 1740 entering the capture area 1751 shows that two fingers contact each other, the electronic device may start a change in the size of the capture area 1751. For example, the electronic device may detect points 1791 and 1792 corresponding to the user's two fingers in an image frame 1710-2 at a time point B. The electronic device may increase the size of the capture area such that the points 1791 and 1792 corresponding to the user's two fingers become both end points of a capture area 1752.

FIG. 17B illustrates an example in which the electronic device changes a position of a capture area in an image based on a user's gesture. The electronic device may determine a capture area 1753 in an image frame 1710-3 at a time point C and recognize a hand gesture of a user's finger entering an area 1793 corresponding to one end point of the determined capture area 1753. For example, the electronic device may change a position of a capture area such that an area 1794, where a user's finger is positioned, corresponds to one end point of a capture area 1754 in an image frame 1710-4 at a time point D. In this case, the electronic device may maintain the same size of the capture area.

Figure 18:
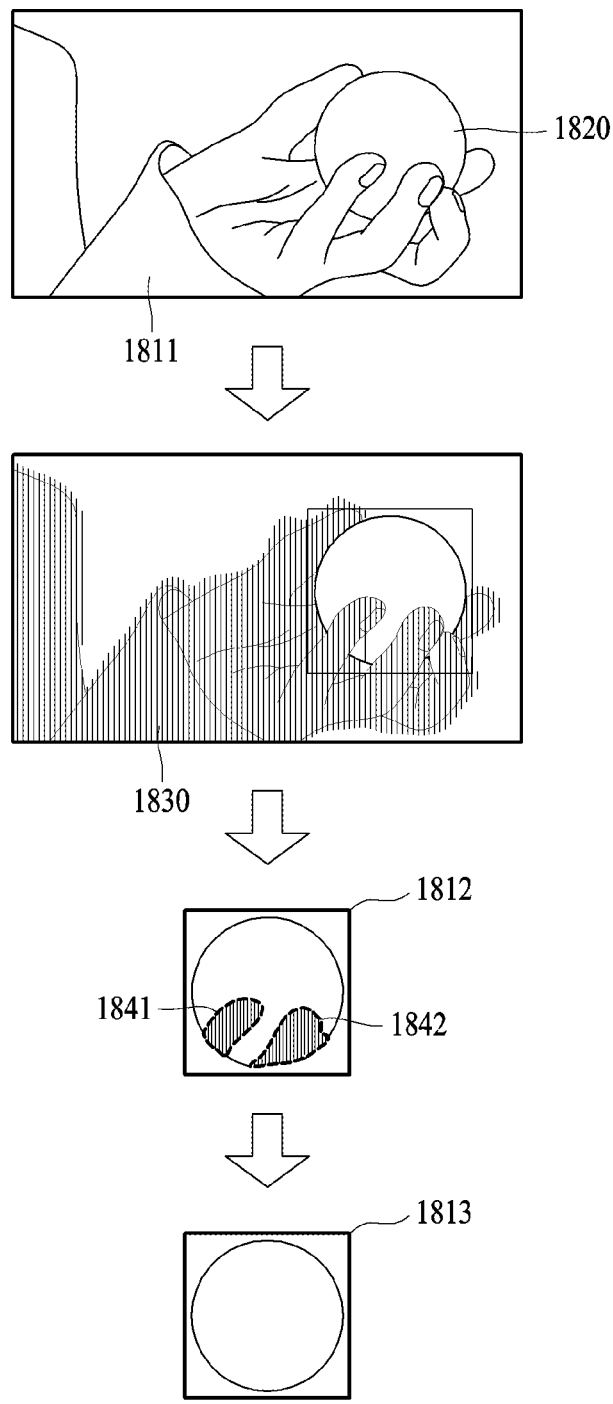
FIG. 18 is a diagram illustrating an example process of generating an image of a target object based on a partial image captured from a capture area according to various embodiments.

FIG. 18 is a diagram illustrating an example process of generating an image of a target object based on a partial image captured from a capture area according to various embodiments.

The electronic device according to an embodiment (e.g., the electronic device 101 of FIG. 1 or the wearable AR device 200 of FIG. 2) may generate an image of a target object based on a partial image captured from a capture area determined from an image. Hereinafter, a partial image captured from a capture area in one image frame constituting an image will be mainly described.

The electronic device may obtain a partial image 1811 captured from a capture area in one image frame. The electronic device may identify a remaining area 1830 in the partial image 1811 except for an object area, in which a target object 1820 is displayed. The electronic device may obtain an image 1812 displaying only an object area, in which the target object 1820 is displayed, by removing the remaining area 1830 from the partial image 1811. In addition, the electronic device may identify areas 1841 and 1842, in which the target object 1820 is covered, in the image 1812. The electronic device may restore the areas 1841 and 1842, in which the target object 1820 is covered, by using the object area, in which the target object 1820 is displayed, and generate a final image 1813 of the target object 1821 according to the restoration of the areas 1841 and 1842, in which the target object 1820 is covered.

In addition, the electronic device may improve image quality of the final image 1813 of the target object 1820. For example, the electronic device may improve the image quality of the final image 1813 by at least one method of colorizing, noise reduction, upscaling, super-resolution, deblurring, low light, or a shadow.

The electronic device may generate final images of the target object 1820 for each image frame included in the image. The electronic device may perform 3D modeling for the target object 1820 by combining the generated final images.

Figure 19:
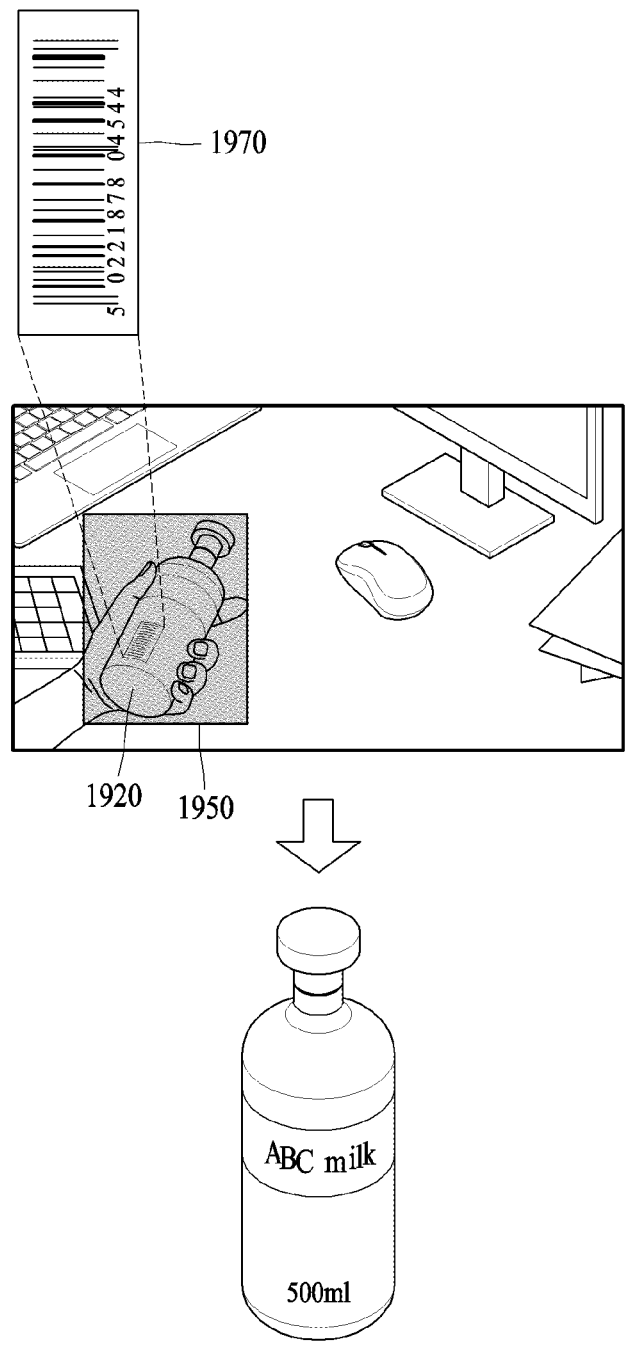
FIGS. 19 and 20 are diagrams illustrating an example method of obtaining an image of a target object according to various embodiments.
Figure 20:
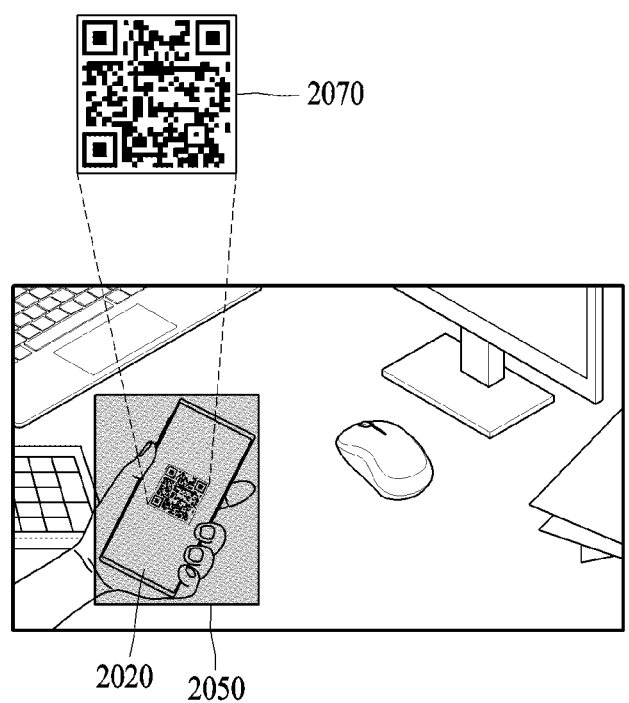

FIGS. 19 and 20 are diagrams illustrating an example method of obtaining an image of a target object according to various embodiments.

An electronic device according to an embodiment (e.g., the electronic device 101 of FIG. 1 or the wearable AR device 200 of FIG. 2) may receive an image of a target object from a database, instead of generating the image of the target object based on a partial image captured from a capture area. For example, the electronic device may establish communication with the database.

FIG. 19 illustrates an example of recognizing a barcode in an object area, in which a target object is displayed. The electronic device may identify an object area, in which a target object 1920 is displayed, in a capture area 1950. The electronic device may recognize a barcode 1970 in the object area, in which the target object 1920 is displayed, and transmit the recognized barcode 1970 to the database. For example, the database may pre-store images of objects matching each barcode. The electronic device may obtain an image of an object matching the barcode 1970 from the database.

FIG. 20 illustrates a case of recognizing a quick response (QR) code in an object area, in which a target object is displayed. The electronic device may identify an object area, in which a target object 2020 is displayed, in a capture area 2050. The electronic device may recognize a QR code 2070 in the object area, in which the target object 2020 is displayed, and transmit the recognized QR code 2070 to the database. For example, the database may pre-store information corresponding to the QR code. The electronic device may receive information matching the QR code 2070 from the database.

An electronic device according to an embodiment may include a camera, a memory configured to store computer-executable instructions, and a processor configured to execute the instructions by accessing the memory. The instructions may be configured to divide an image captured by the camera into a plurality of areas, calculate a number of feature points included in each of the plurality of divided areas by detecting the feature points from the image, select at least one candidate area among the plurality of divided areas based on a result of the calculating, select a target object corresponding to an eye gaze direction of a user by tracking an eye gaze of the user, determine a capture area in the at least one selected candidate area based on detection of occurrence of an event with respect to the target object, and generate an image of the target object based on a partial image captured from the determined capture area in the image.

The instructions may be configured to detect the occurrence of the event based on detection of a gesture of the user associated with the target object from the image.

The instructions may be further configured to detect the gesture of the user associated with the target object entering an event detection area surrounding an object area, in which the target object is displayed, and detect the occurrence of the event in response to the detected gesture of the user which has the same (or similar) form as one of hand gestures pre-stored in the electronic device.

The instructions may be further configured to determine the capture area in the at least one candidate area based on at least one or a combination of two or more of color information on an object area, in which the target object is displayed, a user's preferred area in the image, the feature points detected from the image, or a probability value that the target object is classified as a corresponding object.

The instructions may be further configured to, based on detection of movement of the camera, recalculate the number of feature points included in each of the plurality of divided areas by redetecting the feature points from the image after the occurrence of the event is detected, and reselect the at least one candidate area among the plurality of divided areas based on the recalculated result.

The instructions may be further configured to calculate a noise level in the capture area based on the number of feature points detected from the capture area, color information on an object area, in which the target object is displayed, and a probability value that the target object is classified as a corresponding object, and when the calculated noise level is greater than or equal to a threshold noise level, display, on a display, at least one of a warning message or information guiding positional movement of the capture area.

The instructions may be further configured to compare an object area, in which the target object is displayed, with the capture area, and when the target object is out of the capture area based on the comparison result, change at least one of a position or size of the capture area such that the capture area includes the object area, in which the target object is displayed.

The instructions may be further configured to, when the target object enters the capture area, display, on a display, a graphic object for guiding rotation of the target object, and when the rotation of the target object is detected, display, on the display, images of a plurality of cross sections of the target object captured in the capture area.

The instructions may be further configured to, when movement of the target object is detected from the image, track an object area, in which the target object is displayed, and change at least one of a position or size of the capture area such that the capture area includes the tracked object area.

The instructions may be further configured to, when a gesture of the user associated with the capture area is recognized, change at least one of a position or size of the capture area based on the recognized gesture of the user.

A method implemented by a processor according to an embodiment may include dividing an image captured by a camera into a plurality of areas, calculating a number of feature points included in each of the plurality of divided areas by detecting the feature points from the image, selecting at least one candidate area among the plurality of divided areas based on a result of the calculating, selecting a target object corresponding to an eye gaze direction of a user by tracking an eye gaze of the user, determining a capture area in the at least one selected candidate area based on detection of occurrence of an event with respect to the target object, and generating an image of the target object based on a partial image captured from the determined capture area in the image.

The determining of the capture area may include detecting the occurrence of the event based on detection of a gesture of the user associated with the target object from the image.

The determining of the capture area may include detecting the gesture of the user associated with the target object entering an event detection area surrounding an object area, in which the target object is displayed, and detecting the occurrence of the event in response to the detected gesture of the user which has the same (or similar) form as one of pre-stored hand gestures.

The determining of the capture area may include determining the capture area in the at least one candidate area based on at least one or a combination of two or more of color information on an object area, in which the target object is displayed, a user's preferred area in the image, the feature points detected from the image, or a probability value that the target object is classified as a corresponding object.

The method implemented by the processor according to an embodiment may further include, based on detection of movement of the camera, recalculating the number of feature points included in each of the plurality of divided areas by redetecting the feature points from the image after the occurrence of the event is detected, and reselecting the at least one candidate area among the plurality of divided areas based on the recalculated result.

The method implemented by the processor according to an embodiment may further include calculating a noise level in the capture area based on the number of feature points detected from the capture area, color information on an object area, in which the target object is displayed, and a probability value that the target object is classified as a corresponding object, and when the calculated noise level is greater than or equal to a threshold noise level, displaying, on a display, at least one of a warning message or information guiding positional movement of the capture area.

The method implemented by the processor according to an embodiment may further include comparing an object area, in which the target object is displayed, with the capture area, and when the target object is out of the capture area based on the comparison result, changing at least one of a position or size of the capture area such that the capture area includes the object area, in which the target object is displayed.

The method implemented by the processor according to an embodiment may further include, when the target object enters the capture area, displaying, on a display, a graphic object for guiding rotation of the target object, and, when the rotation of the target object is detected, displaying, on the display, images of a plurality of cross sections of the target object captured in the capture area.

The method implemented by the processor according to an embodiment may further include, when movement of the target object is detected from the image, tracking an object area, in which the target object is displayed, and changing at least one of a position or size of the capture area such that the capture area includes the tracked object area.

The method implemented by the processor according to an embodiment may further include, when a gesture of the user associated with the capture area is recognized, changing at least one of a position or size of the capture area based on the recognized gesture of the user.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a camera;
   memory comprising one or more storage media storing instructions; and
   at least one processor including processing circuitry,
   wherein the instructions, when executed by the at least one processor individually or collectively, cause the electronic device to perform operations comprising:
      dividing an image captured by the camera into a plurality of areas;
      identifying a number of feature points included in each of the plurality of divided areas by detecting the feature points from the image;
      selecting at least one candidate area among the plurality of divided areas, wherein the number of feature points included in each of the at least one candidate area is equal to or less than threshold number;
      selecting a target object corresponding to an eye gaze direction of a user;
      determining a capture area in the at least one selected candidate area based on detecting occurrence of an event with respect to the target object; and
      generating an image of the target object based on a partial image captured from the determined capture area in the image.

2. The electronic device of claim 1, wherein the instructions, when executed by the at least one processor individually or collectively, cause the electronic device to perform operations comprising:
  detecting occurrence of the event based on detecting from the image a gesture of the user associated with the target object.

3. The electronic device of claim 2, wherein the instructions, when executed by the at least one processor individually or collectively, cause the electronic device to perform operations comprising:
  detecting the user gesture entering an event detection area surrounding an object area, in which the target object is displayed; and
  detecting occurrence of the event in response to the detected user gesture having a form corresponding to one of hand gestures pre-stored in the electronic device.

4. The electronic device of claim 1, wherein the instructions, when executed by the at least one processor individually or collectively, cause the electronic device to perform operations comprising:
  determining the capture area in the at least one candidate area, based on at least one or a combination of two or more of color information of an object area, in which the target object is displayed, a user preferred area in the image, the feature points detected from the image, or a probability value that the target object is classified as a corresponding object.

5. The electronic device of claim 1, wherein the instructions, when executed by the at least one processor individually or collectively, cause the electronic device to perform operations comprising:
  based on detecting movement of the camera, reidentifying the number of feature points included in each of the plurality of divided areas by redetecting the feature points from the image after detecting occurrence of the event; and
  reselecting the at least one candidate area among the plurality of divided areas based on the reidentifying.

6. The electronic device of claim 1, wherein the instructions, when executed by the at least one processor individually or collectively, cause the electronic device to perform operations comprising:
  calculating a noise level in the capture area based on the number of feature points detected from the capture area, color information of an object area, in which the target object is displayed, and a probability value that the target object is classified as a corresponding object; and
  when the calculated noise level is greater than or equal to a threshold noise level, displaying, on a display, at least one of a warning message or information guiding positional movement of the capture area.

7. The electronic device of claim 1, wherein the instructions, when executed by the at least one processor individually or collectively, cause the electronic device to perform operations comprising:
  comparing an object area, in which the target object is displayed, with the capture area, and, when the target object is out of the capture area based on the comparing, changing at least one of a position or size of the capture area such that the capture area includes the object area, in which the target object is displayed.

8. The electronic device of claim 1, wherein the instructions, when executed by the at least one processor individually or collectively, cause the electronic device to perform operations comprising:
  when the target object enters the capture area, displaying, on a display, a graphic object for guiding rotation of the target object; and
  when rotation of the target object is detected, displaying, on the display, images of a plurality of cross sections of the target object captured in the capture area.

9. The electronic device of claim 1, wherein the instructions, when executed by the at least one processor individually or collectively, cause the electronic device to perform operations comprising:
  when movement of the target object is detected from the image, tracking an object area, in which the target object is displayed; and
  changing at least one of a position or size of the capture area such that the capture area includes the tracked object area.

10. The electronic device of claim 1, wherein the instructions, when executed by the at least one processor individually or collectively, cause the electronic device to perform operations comprising:
  when a gesture of the user associated with the capture area is recognized, changing at least one of a position or size of the capture area based on the recognized user gesture.

11. A method implemented by at least one processor, the method comprising:
  dividing an image captured by a camera into a plurality of areas;
  identifying a number of feature points included in each of the plurality of divided areas by detecting the feature points from the image;
  selecting at least one candidate area among the plurality of divided areas, wherein the number of feature points included in each of the at least one candidate area is equal to or less than threshold number;
  selecting a target object corresponding to an eye gaze direction of a user;
  determining a capture area in the at least one selected candidate area based on detecting occurrence of an event with respect to the target object; and
  generating an image of the target object based on a partial image captured from the determined capture area in the image.

12. The method of claim 11, wherein the determining of the capture area comprises:
  detecting occurrence of the event based on detecting from the image a gesture of the user associated with the target object.

13. The method of claim 12, wherein the determining of the capture area comprises:
  detecting the user gesture entering an event detection area surrounding an object area, in which the target object is displayed; and
  detecting occurrence of the event in response to the detected user gesture having a form corresponding to one of pre-stored hand gestures.

14. The method of claim 11, wherein the determining of the capture area comprises:
  determining the capture area in the at least one candidate area based on at least one or a combination of two or more of color information of an object area, in which the target object is displayed, a user preferred area in the image, the feature points detected from the image, or a probability value that the target object is classified as a corresponding object.

15. The method of claim 11, further comprising:
based on detecting movement of the camera, reidentifying the number of feature points included in each of the plurality of divided areas by redetecting the feature points from the image after detecting occurrence of the event; and
reselecting the at least one candidate area among the plurality of divided areas based on the reidentifying.

16. The method of claim 11, further comprising:
calculating a noise level in the capture area based on the number of feature points detected from the capture area, color information of an object area, in which the target object is displayed, and a probability value that the target object is classified as a corresponding object; and
when the calculated noise level is greater than or equal to a threshold noise level, displaying, on a display, at least one of a warning message or information guiding positional movement of the capture area.

17. The method of claim 11, further comprising:
comparing an object area, in which the target object is displayed, with the capture area; and
when the target object is out of the capture area based on the comparing, changing at least one of a position or size of the capture area such that the capture area includes the object area, in which the target object is displayed.

18. The method of claim 11, further comprising:
when the target object enters the capture area, displaying, on a display, a graphic object for guiding rotation of the target object; and
when rotation of the target object is detected, displaying, on the display, images of a plurality of cross sections of the target object captured in the capture area.

19. The method of claim 11, further comprising:
when movement of the target object is detected from the image, tracking an object area, in which the target object is displayed, and changing at least one of a position or size of the capture area such that the capture area includes the tracked object area.

20. The method of claim 11, further comprising:
when a gesture of the user associated with the capture area is recognized, changing at least one of a position or size of the capture area based on the recognized user gesture.

21. The electronic device of claim 1, wherein the instructions, when executed by the at least one processor individually or collectively, cause the electronic device to perform operations comprising:
obtaining the partial image from the determined capture area in the image, based on the target object entering the determined capture area.

* * * * *